United States Patent
Takeda et al.

(10) Patent No.: US 12,200,704 B2
(45) Date of Patent: Jan. 14, 2025

(54) TERMINAL, RADIO COMMUNICATION METHOD, AND BASE STATION

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/968,399

(22) PCT Filed: Feb. 9, 2018

(86) PCT No.: PCT/JP2018/004752
§ 371 (c)(1),
(2) Date: Aug. 7, 2020

(87) PCT Pub. No.: WO2019/155641
PCT Pub. Date: Aug. 15, 2019

(65) Prior Publication Data
US 2020/0404651 A1    Dec. 24, 2020

(51) Int. Cl.
*H04W 72/21* (2023.01)
*H04W 72/0446* (2023.01)

(52) U.S. Cl.
CPC ....... *H04W 72/21* (2023.01); *H04W 72/0446* (2013.01)

(58) Field of Classification Search
CPC .......... H04W 72/0413; H04W 72/1368; H04L 5/0053; H04L 5/0055; H04L 5/0094
See application file for complete search history.

(56) References Cited

U.S. PATENT DOCUMENTS

2017/0223695 A1    8/2017  Kwak et al.
2018/0020430 A1*   1/2018  Aiba ............... H04W 24/10
(Continued)

FOREIGN PATENT DOCUMENTS

WO    2018/004246 A1    1/2018
WO    2018111948 A1     6/2018
WO    2018128501 A1     7/2018

OTHER PUBLICATIONS

Extended European Search Report issued in counterpart European Application No. 18905315.0 malled Sep. 6, 2021 (12 pages).
(Continued)

*Primary Examiner* — Bo Hui A Zhu
*Assistant Examiner* — Alvin Zhu
(74) *Attorney, Agent, or Firm* — Osha Bergman Watanabe & Burton LLP

(57) ABSTRACT

A terminal is disclosed including a receiver that receives a first information regarding a first number of slots for use in transmission of an uplink control channel, and a second information regarding a second number of slots for use in transmission of an uplink shared channel; and a processor that controls so as not to perform the transmission of the uplink shared channel in at least one slot in which overlapping occurs, when both the first number of slots for use in transmission of the uplink control channel and the second number of slots for use in transmission of the uplink shared channel are two or more, and if the transmission of the uplink shared channel and the transmission of the uplink control channel overlap in the at least one slot. In other aspects, a radio communication method and a base station are also disclosed.

4 Claims, 23 Drawing Sheets

(56) References Cited

U.S. PATENT DOCUMENTS

| | | | |
|---|---|---|---|
| 2018/0132229 A1* | 5/2018 | Li | H04W 72/0413 |
| 2018/0167933 A1 | 6/2018 | Yin et al. | |
| 2019/0149365 A1* | 5/2019 | Chatterjee | H04L 5/0044 |
| | | | 370/329 |
| 2019/0150172 A1* | 5/2019 | Ang | H04W 24/10 |
| | | | 370/329 |
| 2019/0230683 A1* | 7/2019 | Akkarakaran | H04L 5/0064 |
| 2019/0230689 A1* | 7/2019 | Cao | H04L 27/2602 |
| 2020/0296707 A1 | 9/2020 | Kim et al. | |
| 2021/0250975 A1 | 8/2021 | Lee et al. | |

OTHER PUBLICATIONS

Samsung; "On Simultaneous PUSCH and PUCCH Transmissions"; 3GPP TSG RAN WG1 Meeting NR#3, R1-1715997; Nagoya, Japan, Sep. 18-25, 2017 (3 pages).

Sharp; "Simultaneous PUCCH and PUSCH transmission and collision handling"; 3GPP TSG RAN WG1 NR#90bis Meeting, R1-1718418; Prague, Czech Republic, Oct. 9-13, 2017 (2 pages).

International Search Report issued in PCT/JP2018/004752 mailed on May 1, 2018 (2 pages).

Written Opinion of the International Searching Authority issued in PCT/JP2018/004752 mailed on May 1, 2018 (4 pages).

Huawei, HiSilicon; "Discussion on UCI feedback for URLLC"; 3GPP TSG RAN WG1 Meeting Ad Hoc Meeting, R1-1800054; Vancouver, Canada; Jan. 22-26, 2018 (14 pages).

Samsung; "DL and UL Assignment for NR TDD"; 3GPP TSG RAN WG1 NR Ad-Hoc#2, R1-1711453; Qingdao, China; Jun. 27-30, 2017 (5 pages).

Qualcomm Incorporated; "Summary of remaining issues for UCI piggyback on PUSCH"; 3GPP TSG RAN WG1 Meeting AH 1801, R1-1801263; Vancouver, Canada; Jan. 22-26, 2018 (5 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

3GPP TSG RAN WG1 #90; R1-1713627 "Long PUCCH for UCI of 1 or 2 Bits" Samsung; Prague, Czech Republic; Aug. 21-25, 2017 (5 pages).

Office Action issued in Japanese Application No. 2019-570270; Dated Mar. 8, 2022 (6 pages).

3GPP TSG RAN WG1 #90; R1-1713633 "On Simultaneous PUSCH and PUCCH Transmissions" Samsung; Prague, Czech Republic; Aug. 21-25, 2017 (3 pages).

Office Action in counterpart Indian Patent Application No. 202037037329 issued on May 5, 2022 (7 pages).

Office Action issued in counterpart European Patent Application No. 18 905 315.0 mailed on Jun. 13, 2023 (6 pages).

Office Action issued in counterpart Australian Patent Application No. 2018408266 mailed on Jul. 5, 2023 (4 pages).

LG Electronics; "Remaining issues on UL data transmission procedure"; 3GPP TSG RAN WG1 Meeting AH 1801, R1-1800382; Vancouver, Canada; Jan. 22-26, 2018 (13 pages).

Office Action issued in Chinese Application No. 201880088969.5 dated Aug. 17, 2023 (15 pages).

Office Action issued in Mexican Patent Application No. MX/a/2020/008315, mailed on Oct. 19, 2023 (8 pages).

Office Action issued in Chinese Patent Application No. 201880088969.5, mailed on May 28, 2024 (15 pages).

\* cited by examiner

TERMINAL, RADIO COMMUNICATION METHOD, AND BASE STATION

TECHNICAL FIELD

The present invention relates to a user terminal and a radio communication method of a next-generation mobile communication system.

BACKGROUND ART

In Universal Mobile Telecommunications System (UMTS) networks, for the purpose of higher data rates and lower latency, Long Term Evolution (LTE) has been specified (Non-Patent Literature 1). Furthermore, for the purpose of wider bands and a higher speed than those of LTE, LTE successor systems (also referred to as, for example, LTE-Advanced (LTE-A), Future Radio Access (FRA), 4G, 5G, 5G+ (plus), New RAT (NR) or LTE Rel. 14 or 15~) have been also studied.

Legacy LTE systems (e.g., LTE Rel. 8 to 13) perform communication on Downlink (DL) and/or Uplink (UL) by using a subframe (also referred to as, for example, Transmission Time Intervals (TTIs)) of 1 ms. The subframe is a transmission time unit of 1 channel-coded data packet, and is a processing unit of scheduling, link adaptation and retransmission control (HARQ: Hybrid Automatic Repeat reQuest).

Furthermore, in the legacy LTE systems (e.g., LTE Rel. 8 to 13), a user terminal transmits Uplink Control Information (UCI) by using an uplink control channel (e.g., PUCCH: Physical Uplink Control Channel) or an uplink shared channel (e.g., PUSCH: Physical Uplink Shared Channel). A configuration (format) of the uplink control channel will be referred to as, for example, a PUCCH format.

UCI includes at least one of a Scheduling Request (SR), retransmission control information (HARQ-ACK: Hybrid Automatic Repeat reQuest-Acknowledge, ACK or Negative ACK (NACK)) for DL data (DL data channel (e.g., PDSCH: Physical Downlink Shared Channel)), and Channel State Information (CSI).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

It has been studied for a future radio communication system (e.g., LTE Rel. 14 or subsequent releases, 5G or NR) to flexibly control scheduling of a data channel (also referred to simply as, for example, data including a DL data channel and/or a UL data channel) and/or a control channel (a DL control channel and/or a UL control channel).

By the way, when transmission of uplink data (UL data) and a transmission timing of Uplink Control Information (UCI) overlap, the legacy LTE systems transmit the UL data and the UCI by using an uplink shared channel (PUSCH) (UCI on PUSCH). It is considered that the future radio communication system also transmits UL data and UCI (e.g., A/N) by using a PUSCH similar to the legacy LTE systems.

However, a problem is how to perform UCI on PUSCH while flexibly scheduling a data channel and/or a control channel.

The present invention has been made in light of this point, and one of objects of the present invention is to appropriately transmit uplink data and uplink control information using an uplink shared channel (UCI on PUSCH) even when a data channel and/or a control channel are flexibly scheduled in a future radio communication system.

Solution to Problem

One aspect of a user terminal includes: a transmitting section that transmits uplink data and uplink control information in a slot unit; and a control section that controls transmission of the uplink control information via a channel of the uplink data based on a Downlink (DL)/Uplink (UL) allocation configuration of Time Division Duplex (TDD), and a relationship between a plurality of slots indicated to the transmission of the uplink data and a plurality of slots indicated to the transmission of the uplink control information.

Advantageous Effects of Invention

According to the present invention, it is possible to appropriately transmit uplink data and uplink control information using an uplink shared channel (UCI on PUSCH) even when a data channel and/or a control channel are flexibly scheduled.

DESCRIPTION OF EMBODIMENTS

Figure 1:
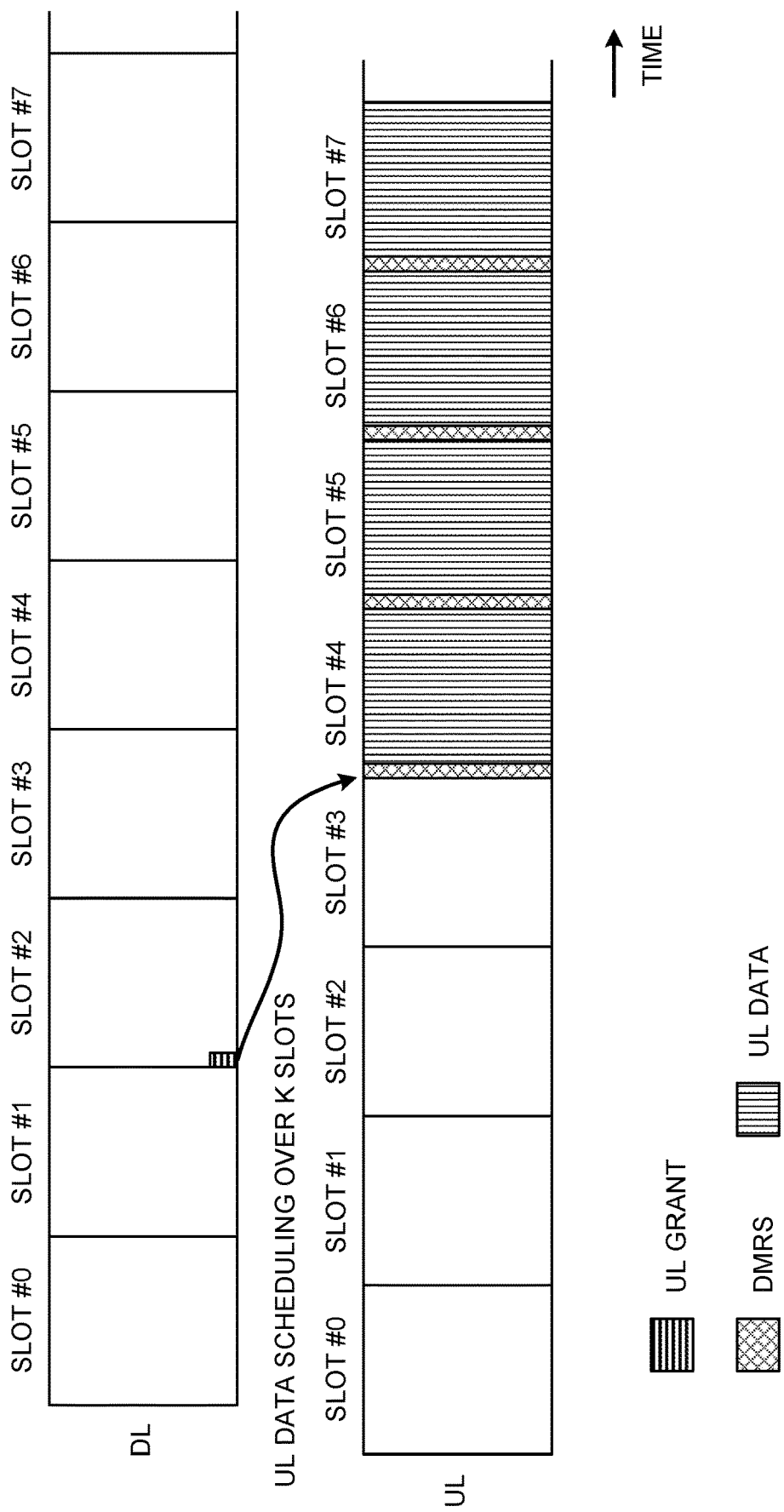
FIG. 1 is a diagram illustrating an example of multi-slot scheduling of a PUSCH.

It has been studied for a future radio communication system (e.g., LTE Rel. 14 or subsequent releases, 5G or NR) to use a time unit (e.g., at least one of a slot, a mini slot or a given number of symbols) whose time duration is changeable as a scheduling unit of a data channel (also referred to simply as, for example, data including a DL data channel and/or a UL data channel).

In this regard, the slot is a time unit based on numerologies (e.g., a subcarrier-spacing and/or a symbol length) applied by a user terminal. The number of symbols per slot may be defined according to the subcarrier-spacing. When, for example, the subcarrier-spacing is 15 kHz or 30 kHz, the number of symbols per slot may be 7 or 14 symbols. On the other hand, when the subcarrier-spacing is 60 kHz or more, the number of symbols per slot may be 14 symbols.

The subcarrier-spacing and a symbol length have a relationship of a reciprocal. Hence, when the number of symbols per slot is identical, as the subcarrier-spacing becomes higher (wider), the slot length becomes shorter. On the other hand, as the subcarrier-spacing becomes lower (narrower), the slot length becomes longer.

Furthermore, the mini slot is a time unit shorter than the slot. The mini slot may include the number of symbols (e.g., 1 to (slot length−1) symbols such as 2 or 3 symbols) smaller than that of the slot. The mini slot in the slot may be applied numerologies (e.g., a subcarrier-spacing and/or a symbol length) identical to those of the slot, or may be applied numerologies (e.g., a subcarrier-spacing higher than that of the slot and/or a symbol length shorter than that of the slot) different from those of the slot.

For example, a mini slot may be a PDSCH or a PUSCH that includes 2, 4 or 7 symbols, and whose start symbol position can be flexibly configured. On the other hand, a PDSCH that is not a mini slot may be a PDSCH whose start symbol position is zeroth to third symbols in a slot, and that has a given symbol length or more. Furthermore, a PUSCH that is not a mini slot may be a PUSCH whose start symbol position is a zeroth symbol in a slot, and that has a given symbol length or more.

A PDSCH and a PUSCH that are not mini slots may be referred to as a PDSCH/PUSCH mapping type A, and a PDSCH and a PUSCH that are mini slots may be referred to as a PDSCH/PUSCH mapping type B. Furthermore, DMRSs may be inserted at different positions according to the PDSCH/PUSCH mapping type. Furthermore, which PDSCH/PUSCH mapping type is used may be configured by a higher layer signaling such as RRC, may be notified by DCI, or may be recognized based on a combination of the higher layer signaling and the DCI.

The future radio communication system is assumed to control transmission and reception (or, for example, allocation) of a signal and/or a channel by applying a plurality of time units to scheduling of, for example, data as different time units from those of the legacy LTE systems are introduced. It is considered that, when scheduling of, for example, data is performed by using the different time units, there are, for example, pluralities of data transmission durations and/or transmission timings. For example, the user terminal that supports a plurality of time units transmits and receives data to be scheduled using the different time units.

In one example, it is considered to apply scheduling (slot-based scheduling) in a first time unit (e.g., a slot unit), and scheduling (non-slot-based scheduling) in a second time unit (e.g., a non-slot unit) shorter than the first time unit. The non-slot unit may be a mini slot unit or a symbol unit. In addition, the slot can include, for example, 7 symbols or 14 symbols, and the mini slot can include 1 to (slot length−1) symbols.

Furthermore, it has been studied to flexibly control a data transmission timing/transmission duration in a time direction according to a data scheduling unit. When, for example, slot-based scheduling is performed, there is also considered a configuration where a PUSCH is allocated to a plurality of slots in addition to a configuration where one data (e.g., PUSCH) is allocated to 1 slot (see FIG. 1). The configuration where a PUSCH is allocated to a plurality of slots will be also referred to as PUSCH multi-slot scheduling or PUSCH multi-slot transmission. FIG. 1 illustrates a case where a PUSCH is scheduled over K slots.

Furthermore, a configuration where multi-slot scheduling is used has been studied for a PUCCH, too. When, for example, slot-based scheduling is performed, a PUCCH is allocated to a plurality of slots. The configuration where the PUCCH is allocated to a plurality of slots will be also referred to as PUCCH multi-slot scheduling or PUCCH multi-slot transmission.

On the other hand, for a future radio communication system (e.g., LTE Rel. 15~, 5G or NR), a configuration (also referred to as, for example, a format or a PUCCH format (PF)) for an uplink control channel (e.g., PUCCH) used to transmit UCI has been studied. For example, it has been studied for LTE Rel. 15 to support 5 types of PFs 0 to 4. In this regard, PF names described below are only exemplary, and different names may be used.

For example, the PFs 0 and 1 are PFs that are used to transmit UCI (e.g., transmission acknowledgement information (also referred to as, for example, HARQ-ACK: Hybrid Automatic Repeat reQuest-Acknowledge, ACK or NACK)) up to 2 bits. The PF 0 can be allocated to 1 or 2 symbols, and therefore will be also referred to as, for example, a short PUCCH or a sequence-based short PUCCH. On the other hand, the PF 1 can be allocated to 4 to 14 symbols, and therefore will be also referred to as, for example, a long PUCCH. According to the PF 1, a plurality of user terminals may be subjected to Code Division Multiplexing (CDM) in an identical resource block (Physical Resource Block (PRB)) by time-domain block-wise spreading that uses at least one of, for example, a Cyclic Shift (CS) and an Orthogonal Cover Code (OCC).

The PFs 2 to 4 are PFs that are used to transmit UCI (e.g., Channel State Information (CSI) (or CSI, and HARQ-ACK and/or a Scheduling Request (SR))) more than 2 bits. The PF 2 can be allocated to 1 or 2 symbols, and therefore will be also referred to as, for example, a short PUCCH. On the other hand, the PFs 3 and 4 can be allocated to 4 to 14 symbols, and therefore will be also referred to as, for example, a long PUCCH. According to the PF 4, a plurality of user terminals may be subjected to CDM by using (frequency-domain) block-wise spreading before DFT.

Resources (e.g., PUCCH resources) used to transmit the uplink control channel are allocated by using a higher layer signaling and/or Downlink Control Information (DCI). In this regard, the higher layer signaling only needs to be at least one of, for example, a Radio Resource Control (RRC) signaling, system information (e.g., at least one of RMSI: Remaining Minimum System Information, OSI: Other System Information, an MIB: Master Information Block and an SIB: System Information Block), and broadcast information (PBCH: Physical Broadcast Channel).

Furthermore, similar to data (e.g., a PDSCH and/or a PUSCH) whose transmission timings/transmission durations are variably controlled, UCI (e.g., A/N) for the data is also assumed to be configured to make a transmission timing/transmission duration changeable per transmission. For example, a base station indicates the transmission timing/transmission duration of the UCI to a UE by using, for example, downlink control information and/or a higher layer signaling. In this case, an A/N feedback timing is flexibly configured in a duration subsequent to downlink control information for notifying a transmission timing/transmission duration of this A/N, and/or a corresponding PDSCH.

Thus, the future radio communication system is assumed to flexibly configure one or both of the transmission timing/transmission duration of A/N for DL data and the transmission timing/transmission duration of the PUSCH. On the other hand, it is also requested for UL transmission to achieve a low Peak-to-Average Power Ratio (PAPR) and/or low Inter-Modulation Distortion (IMD).

As a method for achieving the low PAPR and/or the low 1 MB during UL transmission, there is a method (also referred to as UCI piggyback on PUSCH or UCI on PUSCH) for multiplexing UCI and UL data on a PUSCH to transmit when UCI transmission and UL data (UL-SCH) transmission occur at the same timing.

It is considered that the future radio communication system also performs UCI on PUSCH similar to legacy LTE systems. However, in a case where allocation of a PUSCH is scheduled over a plurality of slots (multi-slot scheduling), a problem is how to control UCI multiplexing (e.g., UCI on PUSCH).

Furthermore, it has been also studied for the future radio communication system to apply multi-slot scheduling, and apply Time Division Duplex (TDD). TDD is applied to the legacy LTE systems, too, and an identical frequency band of different slots (time slots) are used to perform communication on uplink and downlink. That is, according to TDD, uplink and downlink are subjected to time division multiplexing in the identical frequency band.

According to TDD that is applied to the legacy radio communication systems, accompanying switching between downlink and uplink that occurs in a "special subframe", some subframes are allocated to uplink transmission, and some subframes are allocated to downlink transmission. A plurality of configurations to allocate subframes to uplink transmission and downlink transmission are defined as Downlink (DL)/Uplink (UL) configurations. The DL/UL allocation configurations (DL/UL configurations) can be semi-statically configured by a cell-specific (i.e., a channel that UEs in a cell commonly receive) or UE-specific higher layer signaling.

Some defined DL/UL allocation configurations include the above special subframes. The special subframe is segmented to three portions of a downlink portion (DwPTS: Downlink Pilot Time Slot), a Guard Period (GP) and an uplink portion (UpPTS: Uplink Pilot Time Slot). The downlink portion has a reduced subframe length compared to a standard subframe, and therefore has a small data amount that can be transmitted.

When above TDD is applied to the future radio communication system, the above "subframe" may be read as a "slot". Furthermore, in a case where TDD and multi-slot scheduling are applied to the radio communication system, following rules (a definition, a condition and a restriction of an operation of the user terminal) have been studied.

First, a PUCCH multi-slot scheduling rule will be described with reference to FIG. 2. It is assumed that a slot #0 is a start slot, and multi-slot scheduling of Kc slots (Kc is 4 or more) are configured to the PUCCH. In addition, a value that can be configured as Kc is 1, 2, 4 or 8. The value of Kc is configured by an RRC signaling.

When PUCCH transmission can be performed in a Kc slot period subsequent to the slot #0 (when, for example, all Kc slots are UL slots), the user terminal determines a start symbol, the number of symbols, PRB positions and a PUCCH format of the PUCCH transmission in the slot #0, and performs transmission in the slot #0. Furthermore, the user terminal performs multi-slot transmission in the Kc slot period by using the same start symbol, number of symbols and PUCCH format as those of the slot #0.

PRB positions subsequent to a slot #1 can change according to whether or not frequency hopping is applied or a configuration of the frequency hopping. That is, when inter-slot frequency hopping is configured, PUCCH transmission is performed in the slot #1 by a PRB different from that of the slot #0.

Figure 2:
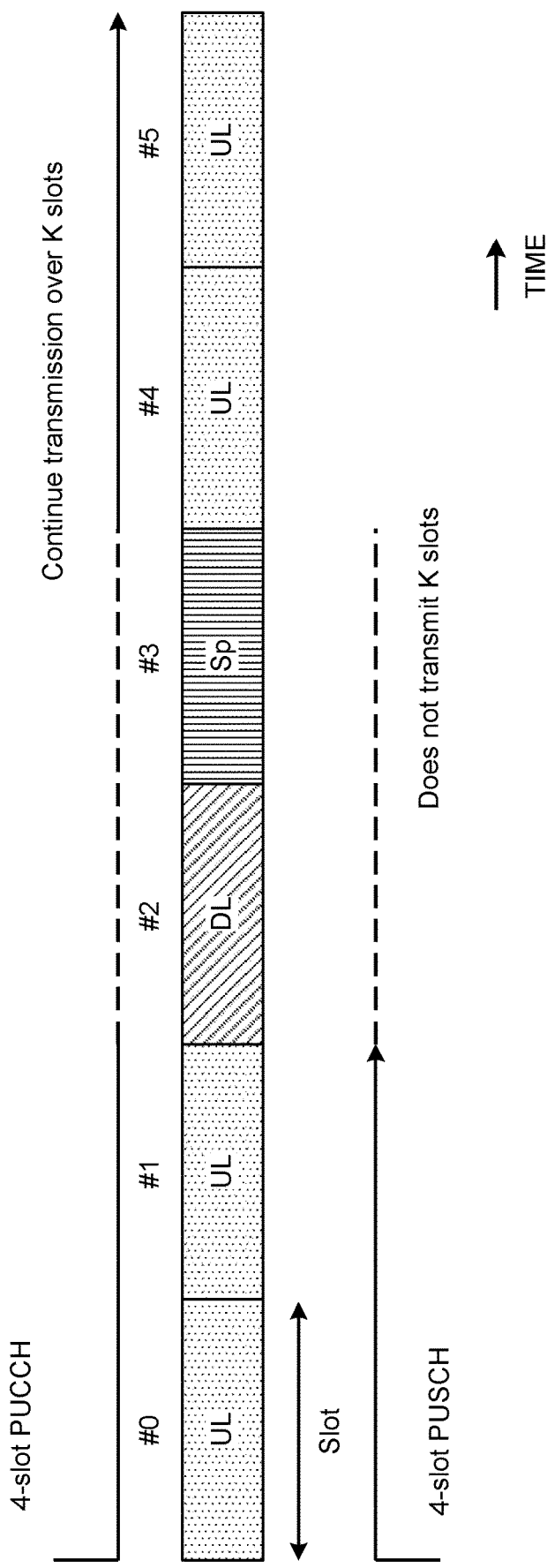
FIG. 2 is a diagram for explaining PUCCH and PUSCH multi-slot scheduling rules according to TDD.

Furthermore, according to the DL/UL allocation configuration, as illustrated in FIG. 2, uplink transmission is allocated to slots #0, #1, #4 and #5 of temporarily contiguous slots #0 to #5. Downlink transmission is allocated to the slot #2. A special slot (the above special subframe is read as the special slot) is configured to the slot #3.

According to PUCCH transmission, uplink transmission that has been started from the slot #0 continues to the slot #1. Subsequently, PUCCH transmission is not performed in the slot #2 to which downlink transmission is allocated. When at least part of PUCCH transmission symbols configured in the slot #3 corresponding to the special slot are DL symbols in the slot #3, PUCCH transmission is not performed in the slot #3. Furthermore, PUCCH transmission that has been interrupted in the slot #2 is resumed in the slots #4 and #5.

Thus, according to PUCCH multi-slot scheduling, when at least part of slots to which uplink transmission is not allocated (i.e., slots to which downlink transmission has been allocated) or PUCCH transmission symbols configured in a slot are configured as symbols (e.g., DL symbols) in which UL transmission cannot be performed in the slot. Therefore, even when PUCCH transmission is interrupted, PUCCH transmission is resumed in a subsequent slot in which PUCCH transmission can be performed, and a PUCCH corresponding to the indicated Kc slots is transmitted.

Next, a PUSCH multi-slot scheduling rule will be described with reference to FIG. 2. It is assumed that the slot #0 is a start slot, and multi-slot scheduling of Kd slots (Kd is 3 or more) is configured to the PUSCH. In addition, a value that can be configured as Kd is 1, 2, 4 or 8. The value of Kd is configured by an RRC signaling.

When PUSCH transmission can be performed in a Kd slot period subsequent to the slot #0 (when, for example, all Kd slots are UL slots), the user terminal determines a start symbol, the number of symbols, PRB positions, a transport block size, a modulation scheme and a DMRS pattern of PUSCH transmission in the slot #0, and performs transmission in the slot #0. Furthermore, the user terminal performs multi-slot transmission in the Kd slot period by using the same start symbol, number of symbols, transport block size, modulation scheme and DMRS pattern as those of the slot #0.

PRB positions subsequent to the slot #1 can change according to whether or not frequency hopping is applied or a configuration of the frequency hopping. That is, when inter-slot frequency hopping is configured, PUSCH transmission is performed in the slot #1 by a PRB different from that of the slot #0. The DL/UL allocation configuration is the same as that in a case of the above PUCCH, and therefore description thereof will be omitted.

According to PUSCH transmission, uplink transmission that has been started from the slot #0 continues to the slot #1. Subsequently, downlink transmission is allocated to the slot #2, and therefore uplink transmission cannot be performed, and contiguous PUSCH transmission is interrupted. According to PUSCH transmission, when contiguous transmission is interrupted in this way, subsequent PUSCH transmission is not performed (cancelled) at a point of time of the interruption. For example, PUSCH transmission is not resumed in the slot #4 to which uplink transmission is allocated.

In addition, it has been studied to apply these PUSCH transmission rules to PDSCH transmission, too.

Figure 3:
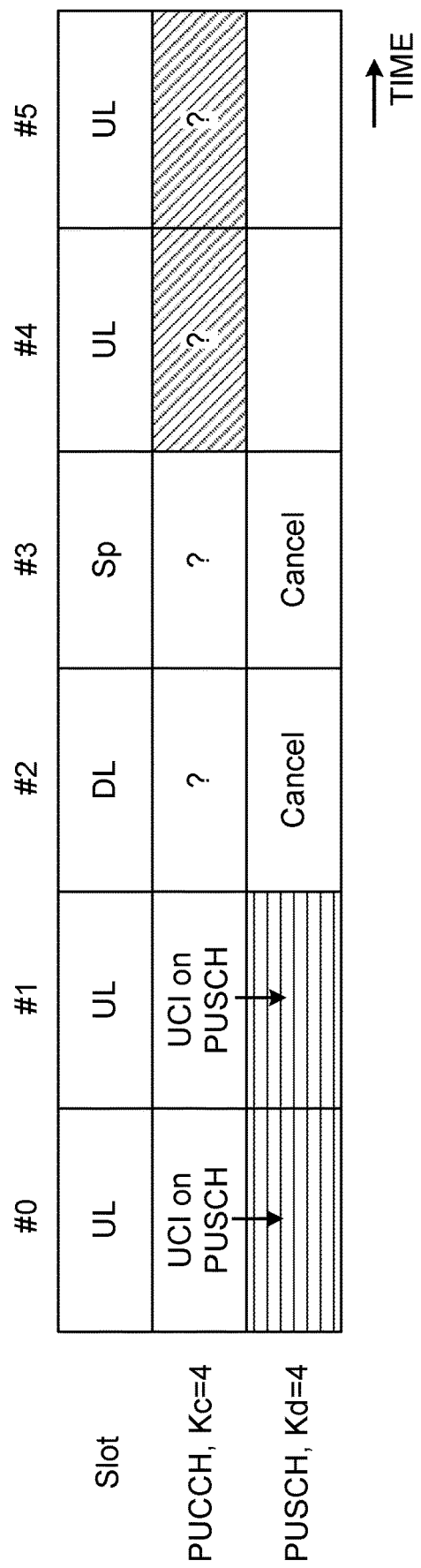
FIG. 3 is a diagram for explaining execution of UCI on PUSCH in a case where TDD and multi-slot scheduling are applied.

As described above, different user terminal operations are ruled (defined) between PUCCH transmission and PUSCH transmission according to TDD. Hence, when UCI on PUSCH is performed during TDD, there are some matters that need to be studied (see FIG. 3).

According to PUCCH and PUSCH multi-slot scheduling, when Kc=Kd holds, and a PUCCH and a PUSCH overlap in all slots, it is considered to perform UCI on PUSCH in all slots in which the above PUCCH and PUSCH overlap to avoid simultaneous PUSCH and PUCCH transmission. However, according to TDD, a slot (e.g., the slot #2 in FIG. 3) to which uplink transmission has been allocated is supposed to interrupt transmission.

After the interruption, in a case of PUCCH transmission, transmission is resumed by using slots to which uplink transmission has been allocated. However, in a case of PUSCH transmission, transmission is not resumed. Hence, it is necessary to study how to perform UCI on PUSCH.

In light of this point, the inventors of this application have conceived controlling UCI on PUSCH based on at least one of the DL/UL allocation configuration, and a relationship between contiguous slots of each of a PUCCH and a PUSCH indicated by multi-slot scheduling. Consequently, even when TDD and multi-slot scheduling are applied, it is possible to appropriately perform UCI on PUSCH.

The present embodiment will be described in detail below. The following embodiment may be applied alone, or may be applied in combination. In addition, according to the present embodiment, the UCI includes at least one of a Scheduling Request (SR), transmission acknowledgement information (also referred to as, for example, HARQ-ACK: Hybrid Automatic Repeat reQuest-Acknowledge, ACK or Negative ACK (NACK) or A/N) for a DL data channel (e.g., PDSCH: Physical Downlink Shared Channel), Channel State Information (CSI) including a Channel Quality Indicator (CQI) and rank information (RI: Rank Indicator), beam index information (BI: Beam Index), and a Buffer Status Report (BSR).

The following description will describe a case where slot-based scheduling is performed as an example. However, the present embodiment is not limited to this. Even when other durations are used as transmission units, the present embodiment is applicable likewise.

Figure 4A:
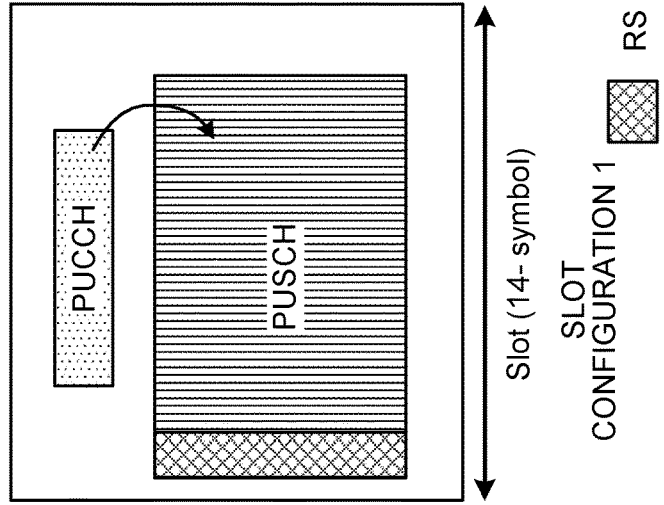
FIGS. 4A, 4B and 4C are diagrams for explaining an arrangement configuration (slot configuration) of the PUCCH and the PUSCH in 1 slot.
Figure 4B:
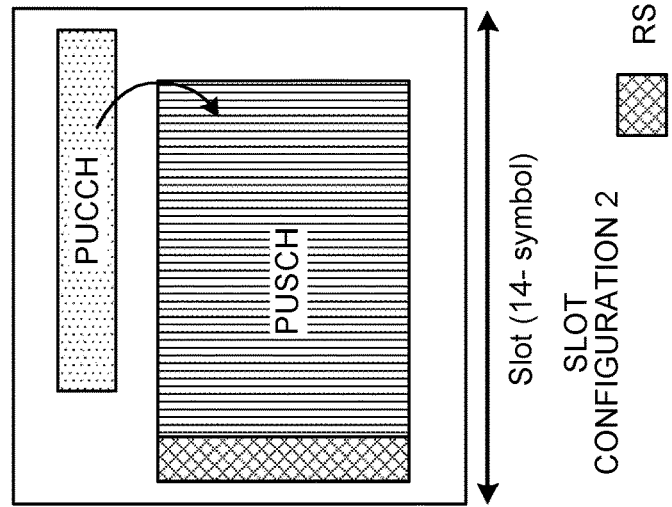
Figure 4C:
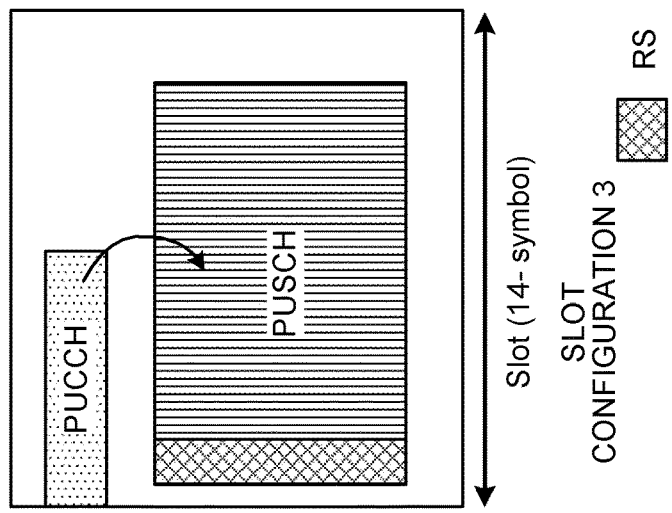
Figure 5A:
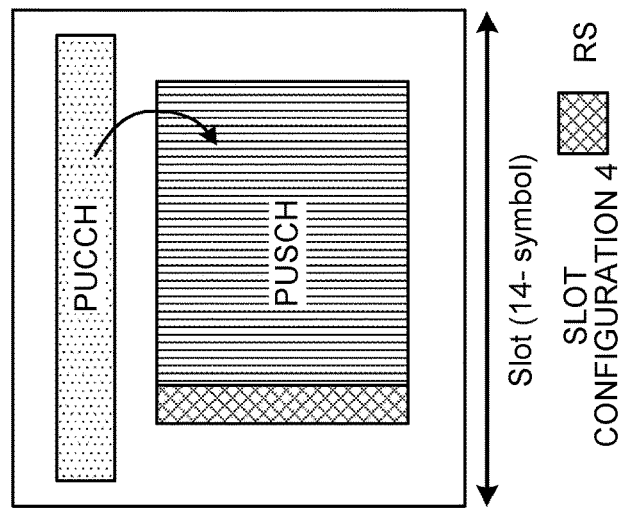
FIGS. 5A, 5B and 5C are diagrams for explaining an arrangement configuration (slot configuration) of the PUCCH and the PUSCH in 1 slot.
Figure 5B:
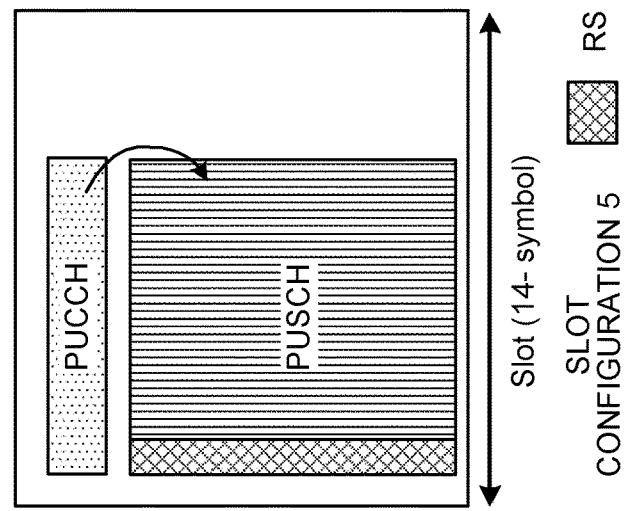
Figure 5C:
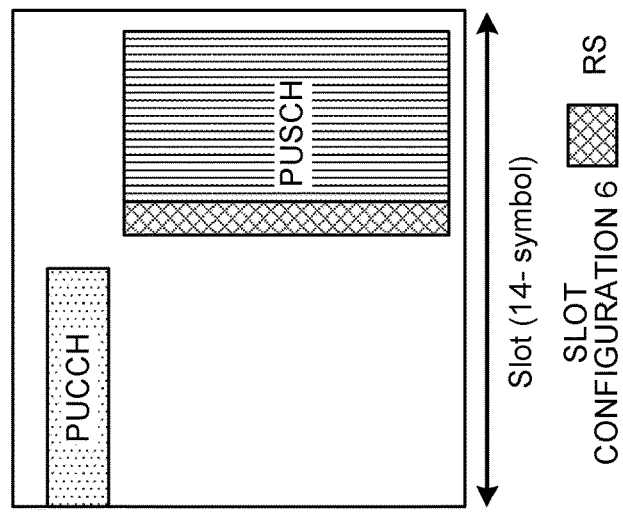

Furthermore, it is assumed that PUCCH and PUSCH allocation symbols partially or completely overlap in each slot. As such PUCCH and PUSCH arrangements (slot configurations) in slots, for example, a plurality of arrangement relationships (cases 1 to 6) illustrated in FIGS. 4 and 5 are supposed.

A slot configuration 1 indicates a configuration where a PUCCH transmission duration is included in a PUSCH transmission duration. That is, a PUCCH start position (a start position on a time axis (time-domain)) comes later than a PUSCH start position, and a PUCCH end position (an end position on the time axis (time-domain)) comes earlier than a PUSCH end position.

Slot configurations 2 and 3 indicate configurations where the PUCCH transmission durations and the PUSCH transmission durations partially overlap. According to the slot configuration 2, the PUCCH start position comes later than the PUSCH start position, and the PUCCH end position comes later than the PUSCH end position. According to the slot configuration 3, the PUCCH start position comes earlier than the PUSCH start position, and the PUCCH end position comes earlier than the PUSCH end position.

A slot configuration 4 indicates a configuration where the PUCCH transmission duration includes the PUSCH transmission duration. That is, the PUCCH start position comes earlier than the PUSCH start position, and the PUCCH end position comes later than the PUSCH end position.

A slot configuration 5 indicates a configuration where the PUCCH transmission duration and the PUSCH (including a reference signal) transmission duration are configured to the same duration. That is, the PUCCH start position is equal to the PUSCH start position, and the PUCCH end position is equal to the PUSCH end position.

A slot configuration 6 indicates a case where the PUCCH transmission duration and the PUSCH (including the reference signal) transmission duration are configured not to overlap. That is, the PUCCH and the PUSCH are orthogonal.

A case where a start position and a transmission duration of one of the PUCCH and the PUSCH entirely or partially overlap those of the other one is applied to the present invention. That is, at least one of the slot configurations 1 to 5 in FIGS. 4 and 5 can be applied as the slot configuration according to the present invention.

In other words, in a case of the configuration 6, UCI on PUSCH may not be applied, and the PUCCH and the PUSCH may be independently controlled. When, for example, a relationship between the PUCCH and the PUSCH in each slot is temporarily orthogonal as in the configuration 6, and multi-slot scheduling of 4 slots is configured to the PUCCH and the PUSCH in the slot #0 in FIG. 2, the user terminal transmits the PUCCH in the slots #0, #1, #4 and #5, and transmits the PUSCH in the slots #0 and #1.

(First Aspect)

The first aspect will describe control in a case where the number of slots (Kc) indicated for a PUCCH and the number of slots (Kd) indicated for a PUSCH are equal, and start positions (first slots of multiple slots) match between the PUCCH and the PUSCH during multi-slot scheduling.

Specific cases of the first aspect will be described below. In addition, scheduling may be performed by a radio base station (gNB), and the following control may be performed by a user terminal.

(Case 1-1)

Figure 6:
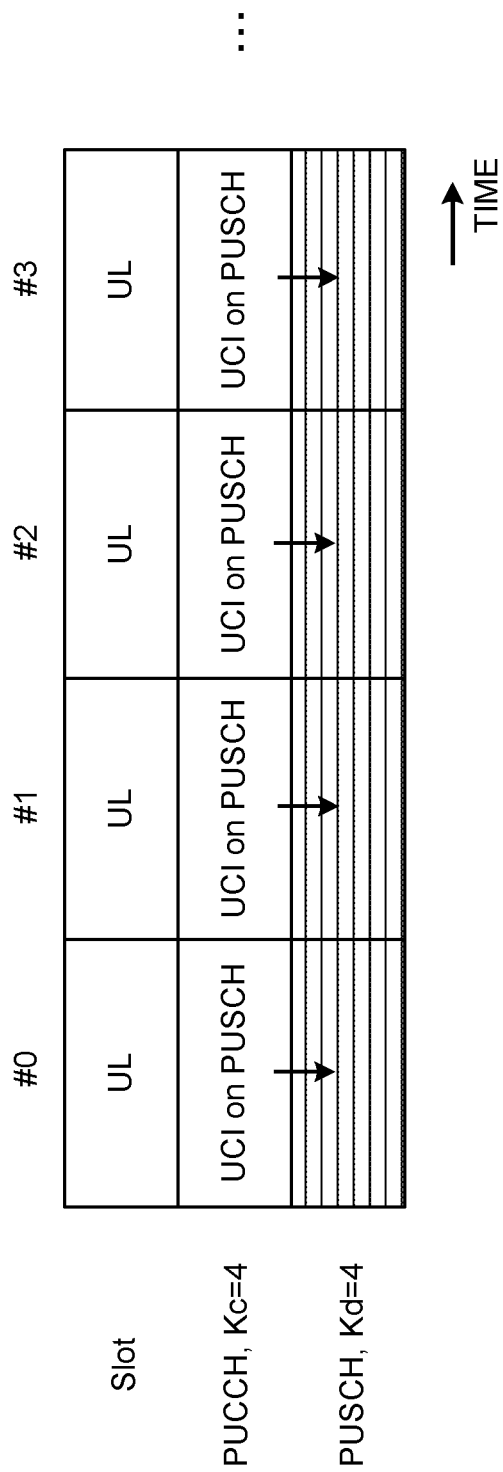
FIG. 6 is a diagram for explaining UCI on PUSCH control in a case 1-1 according to a first aspect.

The case 1-1 will describe a case where uplink transmission is allocated to all slots corresponding to Kc from the above start position in a DL/UL allocation configuration (a case where the slots corresponding to Kc do not include slots other than uplink transmission). That is, slots to which uplink transmission is not allocated (i.e., slots to which downlink transmission has been allocated or special slots) do not interrupt PUCCH/PUSCH transmission of multiple slots. In this case, UCI on PUSCH is performed in all slots corresponding to Kc. More specifically, as illustrated in FIG. 6, UCI on PUSCH is performed in slots #0 to #3.

In addition, rate matching/puncture control of a UCI mapping pattern and UL data according to UCI on PUSCH may be common between all slots that compose the multiple slots.

(Case 1-2)

The case 1-2 will describe a case where slots corresponding to Kc from the above start position are slots to which downlink transmission has been allocated (or special slots) in the DL/UL allocation configuration. That is, the slots to which downlink transmission has been allocated (or the special slots) interrupt PUCCH/PUSCH transmission of multiple slots. This case supposes following two types of control (options).

(Option 1-2a)

According to this option, a PUSCH multi-slot scheduling rule is applied to PUCCH multi-slot scheduling. As described above, according to the PUSCH multi-slot scheduling, when slots to which uplink transmission is not allocated (i.e., slots to which downlink transmission has been allocated or special slots) interrupt PUSCH transmission, subsequent PUSCH transmission is cancelled.

This rule is applied to PUCCH multi-slot scheduling, too. Hence, when slots to which uplink transmission is not allocated (i.e., slots to which downlink transmission has been allocated or special slots) interrupt PUCCH transmission, subsequent PUCCH transmission is cancelled. On the other hand, UCI on PUSCH is performed in slots that are slots before PUSCH transmission is interrupted, and in which a PUSCH and a PUCCH are concurrently scheduled.

Figure 7:
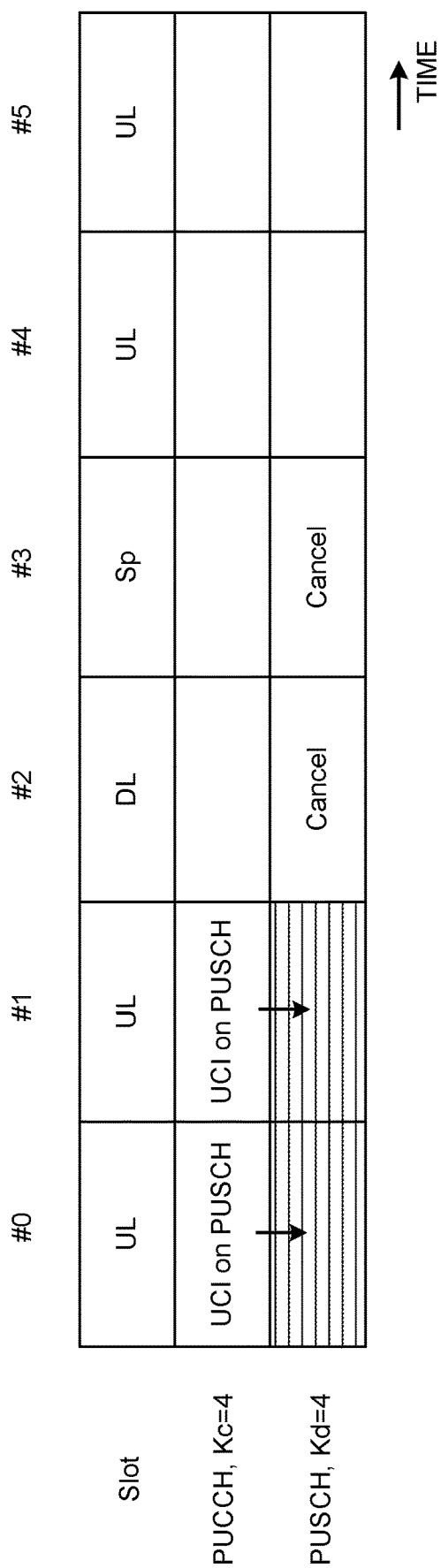
FIG. 7 is a diagram for explaining UCI on PUSCH control in a case 1-2 according to the first aspect.

More specifically, as illustrated in FIG. 7, UCI on PUSCH is performed in slots #0 and #1. On the other hand, PUCCH transmission is not performed even in the slots #4 and #5 to which uplink transmission has been allocated after the interruption of PUCCH/PUSCH transmission. PUSCH transmission is not performed, either, in the slots #4 and #5. By so doing, the UE can appropriately transmit UCI that has been replaced (piggybacked) from the PUCCH to the PUSCH by UCI on PUSCH, and prevent a PUCCH from being unnecessarily transmitted after the slot #4.

(Option 1-2b)

According to this option, both of the PUCCH multi-slot scheduling rule and the PUSCH multi-slot scheduling rule are maintained. Furthermore, UCI on PUSCH is performed in slots that are slots before PUSCH transmission is interrupted, and in which a PUSCH and a PUCCH are concurrently scheduled.

Figure 8:
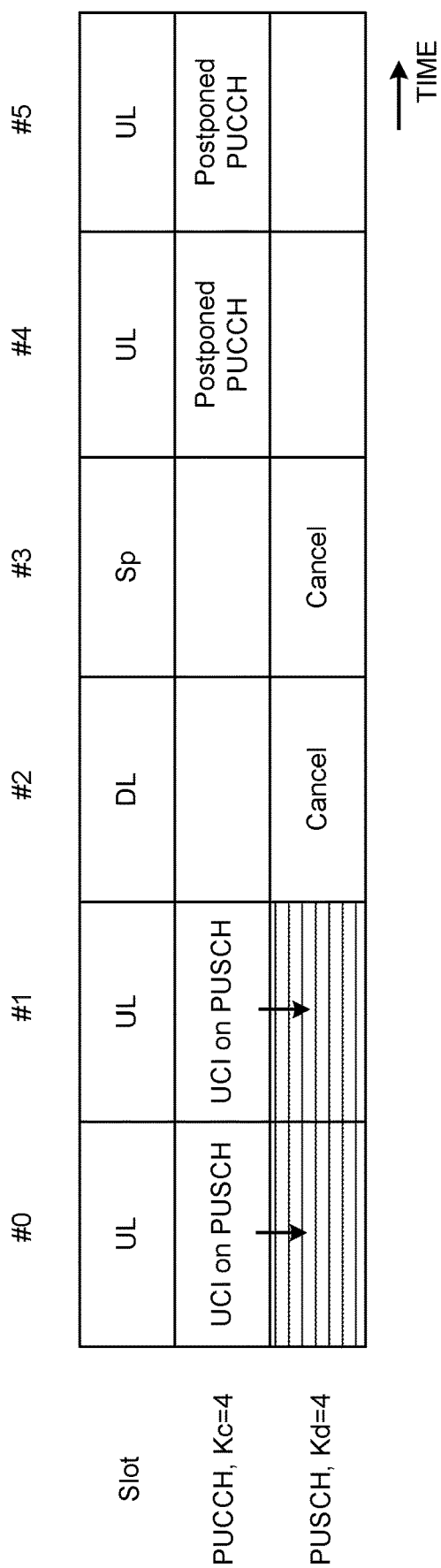
FIG. 8 is a diagram for explaining UCI on PUSCH control in the case 1-2 according to the first aspect.

More specifically, as illustrated in FIG. 8, UCI on PUSCH is performed in the slots #0 to #1. On the other hand, PUCCH transmission is not performed in the slots #4 and #5 to which uplink transmission has been allocated after the interruption of PUCCH/PUSCH transmission. On the other hand, PUSCH transmission is performed in the slots #4 and #5. By so doing, it is possible to reserve the number of transmission slots of UCI irrespectively of whether or not UCI on PUSCH is applied, and improve UCI quality.

According to the above-described first aspect, even when a data channel and/or a control channel are flexibly scheduled, it is possible to appropriately transmit uplink data and uplink control information using an uplink shared channel (UCI on PUSCH). Even when, for example, Time Division Duplex (TDD) and multi-slot scheduling are applied, it is possible to appropriately perform UCI on PUSCH.

(Second Aspect)

The second aspect will describe control in a case where the number of slots (Kc) indicated for a PUCCH and the number of slots (Kd) indicated for a PUSCH are different, and start positions (first slots of multiple slots) do not match between the PUCCH and the PUSCH during multi-slot scheduling.

Specific cases of the second aspect will be described below. In addition, scheduling may be performed by a radio base station (gNB), and the following control may be performed by a user terminal.

(Case 2-1)

This case will describe a case where a PUCCH/PUSCH can be transmitted in all slots to which the PUCCH/PUSCH of multiple slots have been allocated. This is, for example, a case where, even when a DL/UL allocation configuration is configured, all slots to which the PUCCH/PUSCH of the multiple slots have been allocated are uplink slots (a case where the indicated multiple slots do not include slots other than uplink transmission). That is, PUCCH/PUSCH transmission of the multiple slots is not interrupted by the DL/UL allocation configuration.

Figure 9:
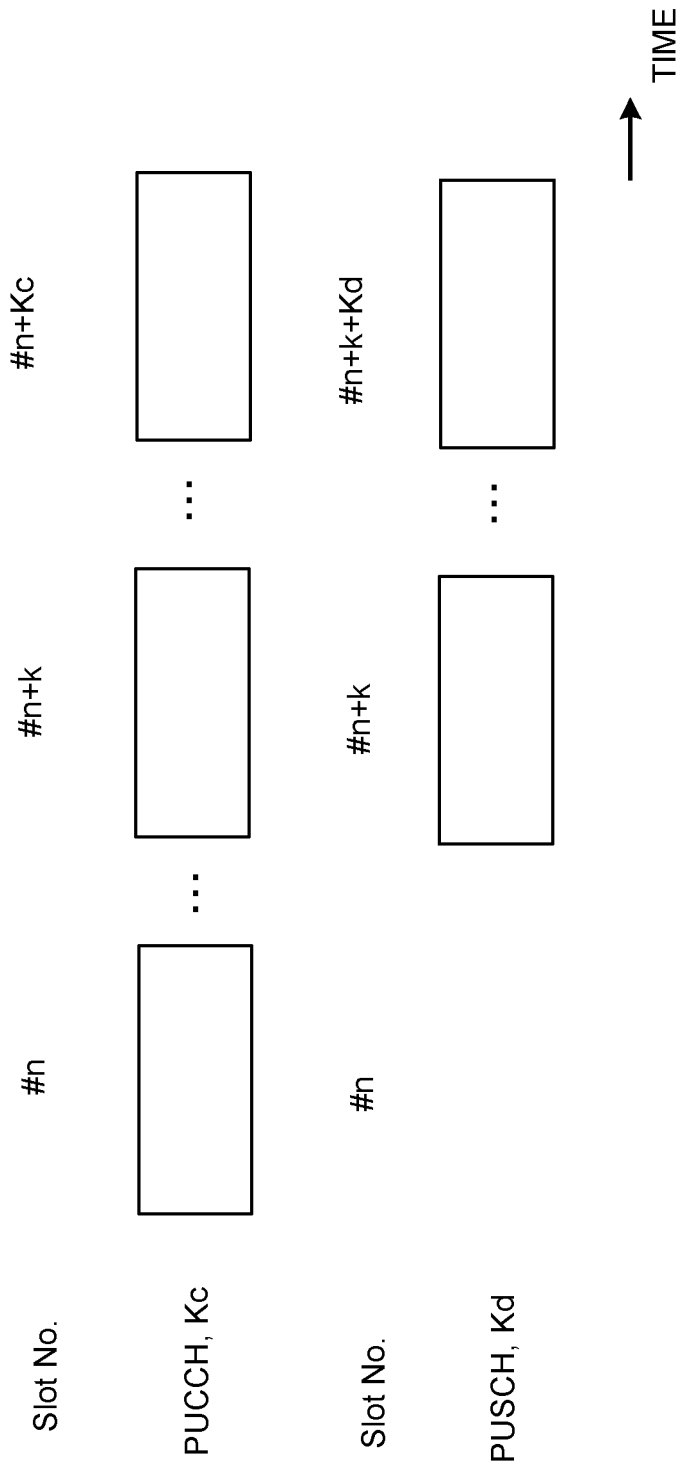
FIG. 9 is a diagram for explaining UCI on PUSCH control in a case 2-1 according to a second aspect.

Furthermore, the case 2-1 will describe control in a case where a start position (start slot) of the multiple slots of the scheduled PUCCH comes before a PUSCH start position. The PUCCH start slot is #n, and the PUSCH start slot is indicated as #n+k (see FIG. 9).

(Case 2-1a)

The case 2-1 is further classified. This case assumes that PUCCH and PUSCH end slots match (see FIG. 9). This case 2-1a supposes following control (options).

(Option 2-1a-1)

According to this option, UCI on PUSCH is performed in slots in which a PUCCH and a PUSCH overlap. Only PUCCH transmission is performed in slots in which the PUCCH and the PUSCH do not overlap, i.e., slots in which only PUCCH transmission is indicated. By so doing, it is possible to transmit both of UCI and UL data while maintaining a UCI transmission start time and a UL data transmission start time, and consequently suppress an increase in a terminal processing burden.

(Option 2-1a-2)

According to this option, only transmission that is started earlier among PUCCH transmission and PUSCH transmission is performed, and transmission that is started later is cancelled. In above FIG. 9, only PUCCH transmission is performed, and PUSCH transmission is cancelled. By so doing, the terminal does not need to perform PUSCH transmission processing after UCI transmission starts, and consequently can reduce a terminal processing burden.
(Option 2-1a-3)

According to this option, transmission that is started earlier among PUCCH transmission and PUSCH transmission is cancelled (dropped), and only transmission that is started later is performed. In above FIG. 9, PUCCH transmission is cancelled, and only PUSCH transmission is performed. In addition, the user terminal cancels the transmission that is started earlier as much as possible, or drops transmission data. By so doing, it is possible to control temporarily new scheduling information preferentially over old scheduling information, and consequently appropriately realize low latency service.
(Case 2-1b)

Figure 10:
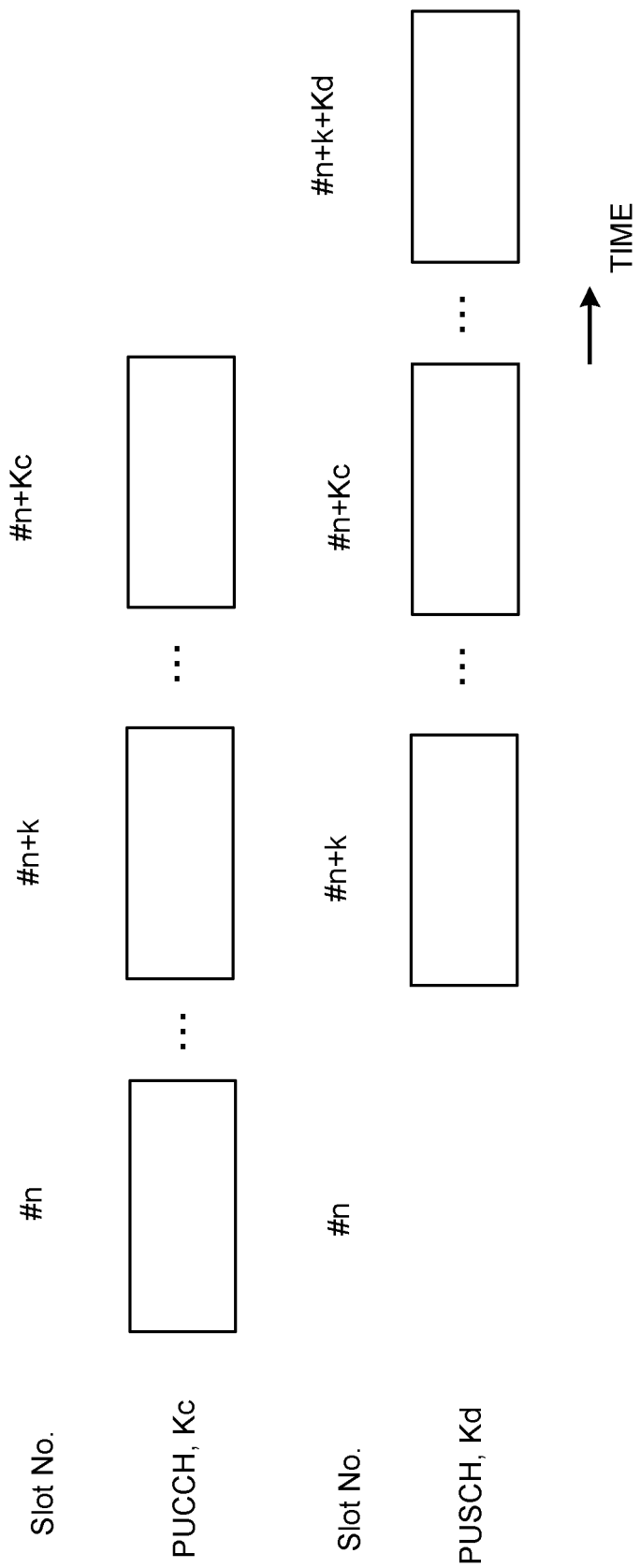
FIG. 10 is a diagram for explaining UCI on PUSCH control in a case 2-1b according to the second aspect.

The case 2-1 is further classified. In this case 2-1b, that a start position (start slot) of multiple slots of a scheduled PUCCH comes before a PUSCH start position is similar to the previous case 2-1a, yet the case 2-1b assumes that a PUCCH end slot comes earlier than a PUSCH end slot (see FIG. 10). This case 2-1b supposes following control (options).
(Option 2-1b-1)

According to this option, UCI on PUSCH is performed in slots in which a PUCCH and a PUSCH overlap. Each transmission is performed in slots in which the PUCCH and the PUSCH do not overlap, i.e., slots in which only PUCCH transmission is indicated and slots in which only PUSCH transmission is indicated.
(Option 2-1b-2)

According to this option, UCI on PUSCH is performed in all slots. In addition, UCI or uplink data of slots in which a PUCCH and a PUSCH overlap is copied to slots in which the PUCCH and the PUSCH do not overlap to perform UCI on PUSCH. By so doing, it is possible to apply UCI on PUSCH to the PUSCH of multiple slots likewise between slots (i.e., different mapping is not applied per slot), and consequently reduce a terminal processing burden. Furthermore, it is possible to increase the number of times of UCI transmission, so that it is easy to reserve UCI quality.
(Option 2-1b-3)

According to this option, only transmission that is started earlier among PUCCH transmission and PUSCH transmission is performed, and transmission that is started later is cancelled, or the transmission is performed only in slots in which a PUCCH and a PUSCH do not overlap. More specifically, only PUCCH transmission is performed, and PUSCH transmission is cancelled. Alternatively, only PUCCH transmission is performed in slots in which only the PUCCH is indicated and slots in which the PUCCH and the PUSCH are indicated in an overlapping manner, and, furthermore, only PUSCH transmission is performed in slots in which only the PUSCH is indicated. By so doing, it is possible to provide an occasion to transmit both of UCI and UL data. Furthermore, UCI on PUSCH is not controlled, so that it is possible to reduce a terminal processing burden.
(Option 2-1b-4)

According to this option, only transmission that is started later among PUCCH transmission and PUSCH transmission is performed, and transmission that is started earlier is cancelled or the transmission is performed only in slots in which a PUCCH and a PUSCH do not overlap. More specifically, only PUSCH transmission is performed, and PUCCH transmission is cancelled. Alternatively, only PUSCH transmission is performed in slots in which only the PUSCH is indicated and slots in which the PUCCH and the PUSCH are indicated in an overlapping manner, and, furthermore, only PUCCH transmission is performed in slots in which only the PUCCH is indicated. By so doing, it is possible to control temporarily new scheduling information preferentially over old scheduling information, and consequently appropriately realize low latency service.
(Case 2-1c)

Figure 11:
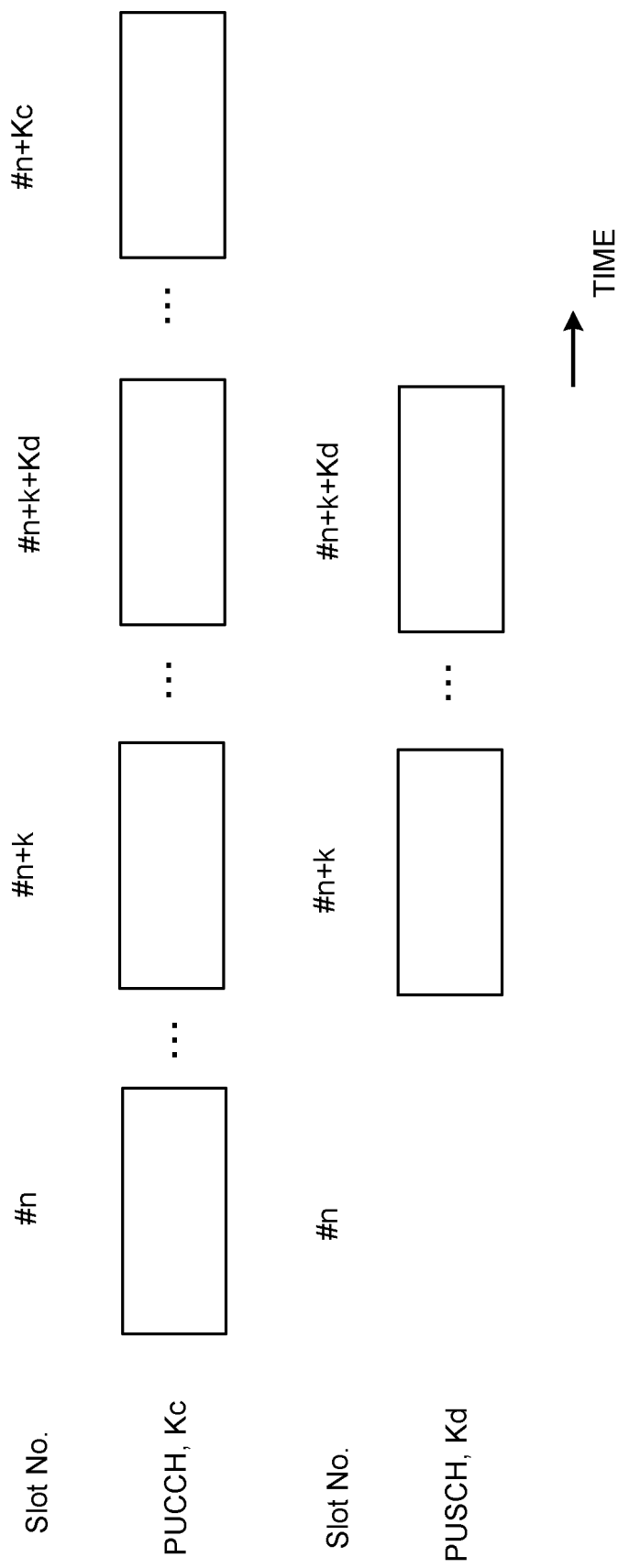
FIG. 11 is a diagram for explaining UCI on PUSCH control in a case 2-1c according to the second aspect.

The case 2-1 is further classified. In this case 2-1c, that a start position (start slot) of multiple slots of a scheduled PUCCH comes before a PUSCH start position is similar to the previous cases 2-1a and 2-1b, yet the case 2-1c assumes that a PUCCH end slot comes earlier than a PUSCH end slot (see FIG. 11). This case 2-1c supposes following control (options).
(Option 2-1c-1)

According to this option, UCI on PUSCH is performed in slots in which a PUCCH and a PUSCH overlap. Only PUCCH transmission is performed in slots in which the PUCCH and the PUSCH do not overlap, i.e., slots in which only PUCCH transmission is indicated. By so doing, it is possible to reserve the number of times of repetition of UCI, and improve UCI quality.
(Option 2-1c-2)

According to this option, only transmission that is started earlier among PUCCH transmission and PUSCH transmission is performed, and transmission that is started later is cancelled. In above FIG. 11, only PUCCH transmission is performed, and PUSCH transmission is cancelled.
(Option 2-1c-3)

According to this option, only transmission that is started earlier among PUCCH transmission and PUSCH transmission is performed, and transmission that is started later is cancelled, or the transmission is performed only in slots in which a PUCCH and a PUSCH do not overlap. More specifically, only PUCCH transmission is performed, and PUSCH transmission is cancelled. Alternatively, only PUCCH transmission is performed in slots in which only the PUCCH is indicated and slots in which the PUCCH and the PUSCH are indicated in an overlapping manner, and, furthermore, only PUSCH transmission is performed in slots in which only the PUSCH is indicated. By so doing, the user terminal does not need to take subsequent transmission into account, and consequently can reduce a terminal processing burden.
(Case 2-2)

This case is a case where uplink transmission is allocated to all slots in the DL/UL allocation configuration (a case where the indicated multiple slots do not include slots other than uplink transmission), and is the same as the case 2-1. That is, slots to which uplink transmission is not allocated (i.e., slots to which downlink transmission has been allocated or special slots) do not interrupt PUCCH/PUSCH transmission of multiple slots.

Figure 12:
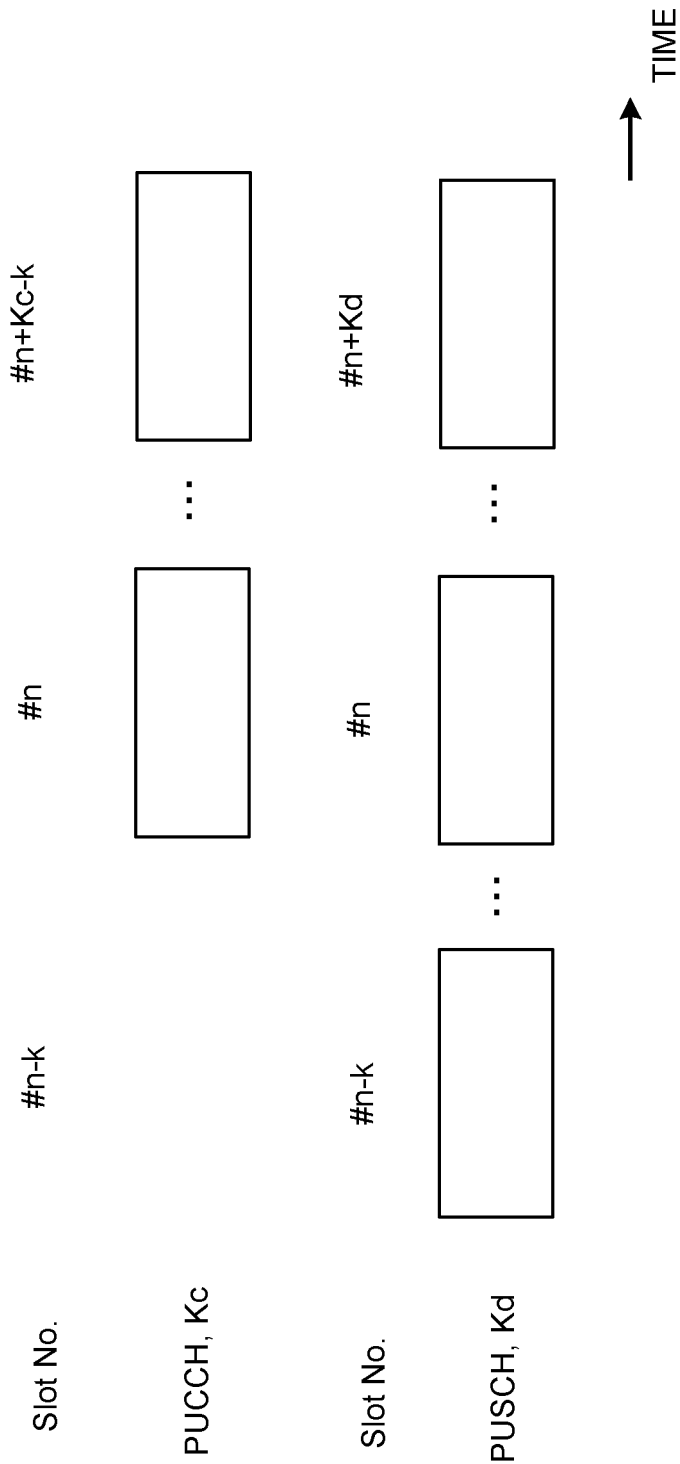
FIG. 12 is a diagram for explaining UCI on PUSCH control in a case 2-2 according to the second aspect.

Furthermore, the case 2-2 will describe control in a case where a start position (start slot) of the multiple slots of the scheduled PUCCH comes before a PUSCH start position. A PUCCH start slot is #n, and a PUSCH start slot is indicated as #n-k (see FIG. 12).
(Case 2-2a)

The case 2-2 is further classified. This case assumes that PUCCH and PUSCH end slots match (see FIG. 12). This case 2-2a supposes following control (options).
(Option 2-2a-1)

According to this option, UCI on PUSCH is performed in slots in which a PUCCH and a PUSCH overlap. Only PUCCH transmission is performed in slots in which the PUCCH and the PUSCH do not overlap, i.e., slots in which only PUCCH transmission is indicated. By so doing, it is possible to transmit both of UCI and UL data an appropriate number of times without changing a UCI transmission start timing and a UL data transmission start timing, and consequently reserve quality while suppressing an increase in a terminal processing burden.

(Option 2-2a-2)

According to this option, only transmission that is started earlier among PUCCH transmission and PUSCH transmission is performed, and transmission that is started later is cancelled. In above FIG. 12, only PUSCH transmission is performed, and PUCCH transmission is cancelled. By so doing, the user terminal does not need to take subsequent transmission into account, and consequently can reduce a terminal processing burden.

(Option 2-2a-3)

According to this option, transmission that is started earlier among PUCCH transmission and PUSCH transmission is cancelled (dropped), and only transmission that is started later is performed. In above FIG. 12, PUSCH transmission is cancelled, and only PUCCH transmission is performed. In addition, the user terminal cancels the transmission that is started earlier as much as possible, or drops transmission data. By so doing, it is possible to control temporarily new scheduling information preferentially over old scheduling information, and consequently appropriately realize low latency service.

(Case 2-2b)

Figure 13:
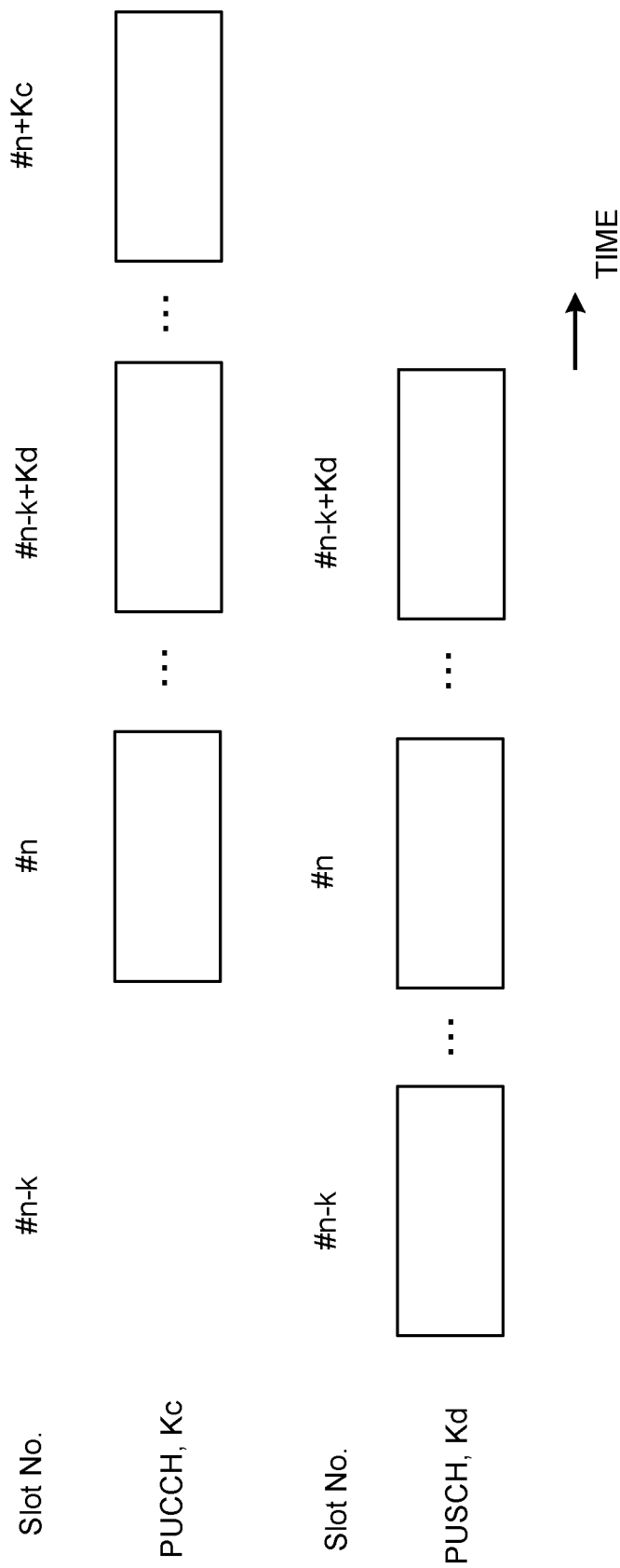
FIG. 13 is a diagram for explaining UCI on PUSCH control in a case 2-2b according to the second aspect.

The case 2-2 is further classified. In this case 2-2b, that a start position (start slot) of multiple slots of a scheduled PUCCH comes before a PUSCH start position is similar to the previous case 2-2a, yet this case 2-2b assumes that a PUCCH end slot comes earlier than a PUSCH end slot (see FIG. 13). This case 2-2b supposes following control (options).

(Option 2-2b-1)

According to this option, UCI on PUSCH is performed in slots in which a PUCCH and a PUSCH overlap. Each transmission is performed in slots in which the PUCCH and the PUSCH do not overlap, i.e., slots in which only PUCCH transmission is indicated and slots in which only PUSCH transmission is indicated. By so doing, it is possible to transmit both of UCI and UL data while maintaining a UCI transmission start time and a UL data transmission start time, and consequently suppress an increase in a terminal processing burden.

(Option 2-2b-2)

According to this option, UCI on PUSCH is performed from a first slot in which a PUCCH and a PUSCH overlap to a last slot in which the PUSCH is indicated. In addition, UCI or UL data of slots in which the PUCCH and the PUSCH overlap is copied to slots in which the PUCCH and the PUSCH do not overlap to perform UCI on PUSCH. By so doing, it is possible to apply UCI on PUSCH to the PUSCH of multiple slots likewise between slots (i.e., different mapping is not applied per slot), and consequently reduce a terminal processing burden. Furthermore, it is possible to increase the number of times of UCI transmission, so that it is easy to reserve UCI quality.

(Option 2-2b-3)

According to this option, only transmission that is started earlier among PUCCH transmission and PUSCH transmission is performed, and transmission that is started later is cancelled, or the transmission is performed only in slots in which a PUCCH and a PUSCH do not overlap. More specifically, only PUSCH transmission is performed, and PUCCH transmission is cancelled. Alternatively, only PUSCH transmission is performed in slots in which only the PUSCH is indicated and slots in which the PUCCH and the PUSCH are indicated in an overlapping manner, and, furthermore, only PUCCH transmission is performed in slots in which only the PUCCH is indicated. By so doing, it is possible to maintain the numbers of transmission slots of UCI and UL data while reducing a terminal processing burden.

(Option 2-2b-4)

According to this option, only transmission that is started later among PUCCH transmission and PUSCH transmission is performed, and transmission that is started earlier is cancelled or the transmission is performed only in slots in which a PUCCH and a PUSCH do not overlap. More specifically, only PUCCH transmission is performed, and PUSCH transmission is cancelled. Alternatively, only PUCCH transmission is performed in slots in which only the PUCCH is indicated and slots in which the PUCCH and the PUSCH are indicated in an overlapping manner, and, furthermore, only PUSCH transmission is performed in slots in which only the PUSCH is indicated. By so doing, it is possible to control temporarily new scheduling information preferentially over old scheduling information, and consequently appropriately realize low latency service.

(Case 2-2c)

Figure 14:
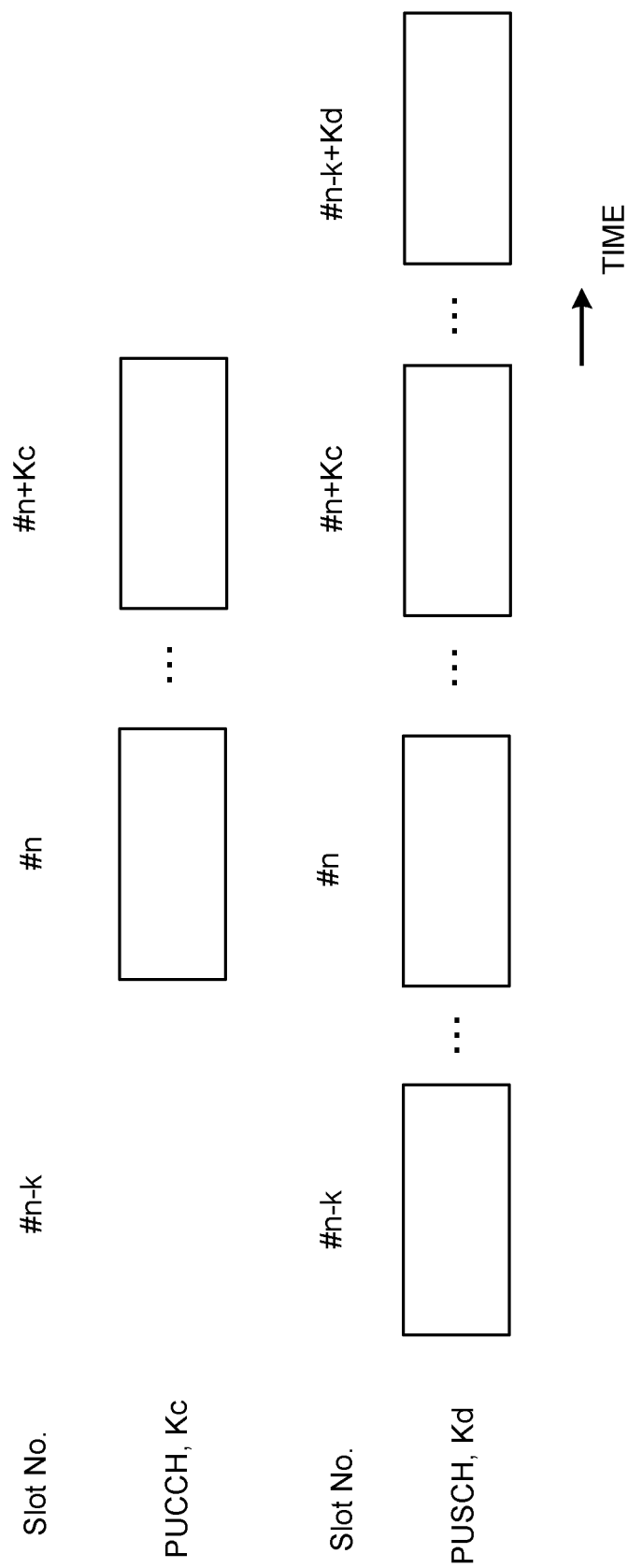
FIG. 14 is a diagram for explaining UCI on PUSCH control in a case 2-2c according to the second aspect.

The case 2-2 is further classified. In this case 2-2c, that a start position (start slot) of multiple slots of a scheduled PUCCH comes before a PUSCH start position is similar to the previous cases 2-2a and 2-2b, yet this case 2-2c assumes that a PUCCH end slot comes earlier than a PUSCH end slot (see FIG. 14). This case 2-2c supposes following control (options).

(Case 2-2c-1)

According to this option, UCI on PUSCH is performed in slots in which a PUCCH and a PUSCH overlap. Only PUCCH transmission is performed in slots in which the PUCCH and the PUSCH do not overlap, i.e., slots in which only PUCCH transmission is indicated. By so doing, it is possible to maintain the numbers of transmission slots for both of UCI and UL data, and reserve quality.

(Option 2-2c-2)

According to this option, only transmission that is started earlier among PUCCH transmission and PUSCH transmission is performed, and transmission that is started later is cancelled. In above FIG. 14, only PUSCH transmission is performed, and PUCCH transmission is cancelled. By so doing, the terminal does not need to take subsequent transmission into account, and consequently can reduce a terminal processing burden.

(Option 2-2c-3)

According to this option, only transmission that is started earlier among PUCCH transmission and PUSCH transmission is performed, and transmission that is started later is cancelled, or the transmission is performed only in slots in which a PUCCH and a PUSCH do not overlap. More specifically, only PUCCH transmission is performed, and PUSCH transmission is cancelled. Alternatively, only PUCCH transmission is performed in slots in which only the PUCCH is indicated and slots in which the PUCCH and the PUSCH are indicated in an overlapping manner, and, furthermore, only PUSCH transmission is performed in slots in which only the PUSCH is indicated. By so doing, it is possible to transmit both of UCI and UL data in at least 1 slot while reducing a terminal processing burden.

(Case 2-3)

This case will describe a case where there are slots to which downlink transmission has been allocated (or special slots) in the DL/UL allocation configuration. That is, the slots to which downlink transmission has been allocated (or the special slots) interrupt PUCCH/PUSCH transmission of multiple slots. This case supposes following two types of control (options).

(Option 2-3a)

According to this option, a PUSCH multi-slot scheduling rule is applied to PUCCH multi-slot scheduling. As described above, according to the PUSCH multi-slot scheduling, when slots to which uplink transmission is not allocated (i.e., slots to which downlink transmission has been allocated or special slots) interrupt PUSCH transmission, subsequent PUSCH transmission is cancelled.

This rule is applied to PUCCH multi-slot scheduling, too. That is, slots to which uplink transmission is not allocated (i.e., slots to which downlink transmission has been allocated or special slots) interrupt PUCCH transmission. subsequent PUCCH transmission is cancelled. On the other hand, UCI on PUSCH is performed in slots that are slots before PUSCH transmission is interrupted, and in which the PUSCH and the PUCCH are concurrently scheduled.

(Option 2-3b)

According to this option, both of the PUCCH multi-slot scheduling rule and the PUSCH multi-slot scheduling rule are maintained. Furthermore, UCI on PUSCH is performed in slots that are slots before PUSCH transmission is interrupted, and in which a PUSCH and a PUCCH are concurrently scheduled.

The above options 2-3a and 2-3b can be realized by combining the options 1-2a and 1-2b in the above first aspect.

According to the above-described second aspect, even when Time Division Duplex (TDD) and multi-slot scheduling are applied, it is possible to appropriately perform UCI on PUSCH.

(Third Aspect)

Figure 15:
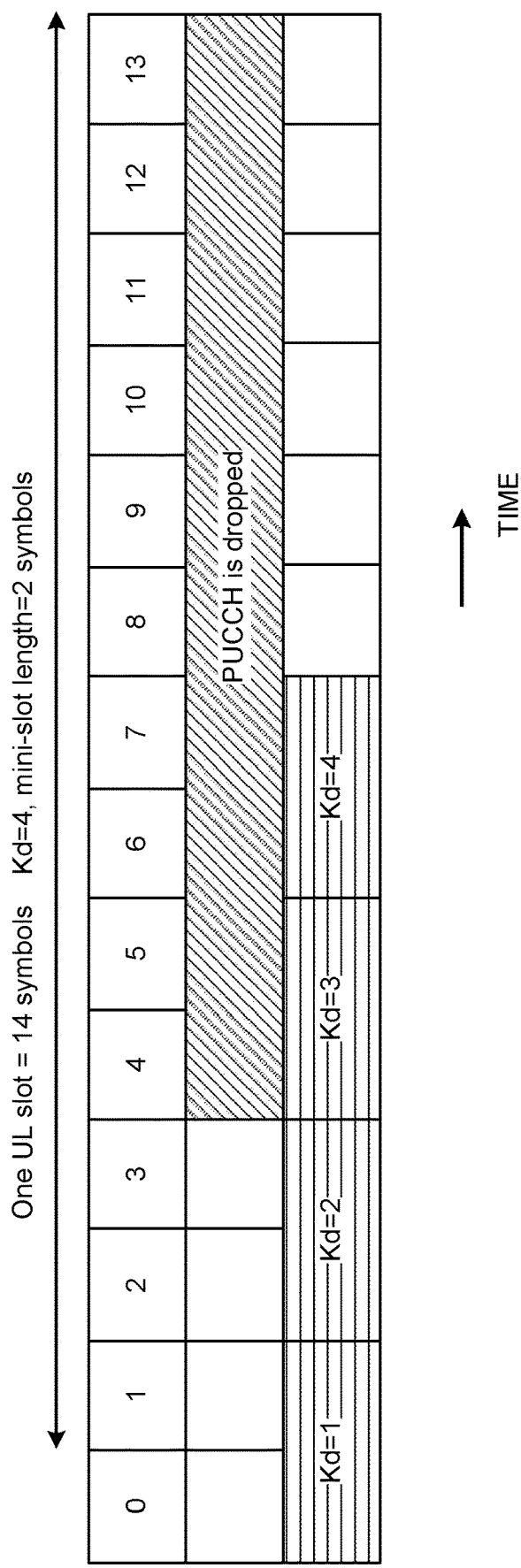
FIG. 15 is a diagram for explaining an overlap of a long PUCCH and short PUSCHs according to a third aspect.

Next, the third aspect will be described. Hereinafter, collision (overlap) of a long PUCCH and mini slot type PUSCHs will be described. FIG. 15 illustrates a configuration of 1 slot. A plurality of mini slot type PUSCHs (short PUSCHs) are repeatedly arranged in 1 slot. More specifically, repetition of the short PUSCHs is configured 4 times in kd=1 to kd=4.

In this state, following three types of control are performed in a case where the long PUCCH and the short PUSCHs overlap.

(Option 3-1)

According to this option, PUCCH (long PUCCH) transmission is cancelled (dropped). Consequently, it is possible to maintain repetition of short PUSCHs configured in advance, and suppress an increase in a terminal processing burden.

(Option 3-2)

According to this option, a PUSCH is not transmitted in a portion (duration) at which a long PUCCH and short PUSCHs overlap. More specifically, the PUSCH is not transmitted in kd=3 and 4. By so doing, it is possible to preferentially transmit subsequently scheduled new information, and preferentially transmit low latency data and low latency UCI.

(Option 3-3)

According to this option, UCI on PUSCH is performed in a portion (duration) at which a long PUCCH and short PUSCHs overlap.

In addition, HARQ-ACK may be punctured or rate-matched. Furthermore, HARQ-ACK mapped in a first mini slot in which the long PUCCH and the short PUSCHs overlap may be repeated during subsequent transmission in mini slots. Furthermore, HARQ-ACK may be mapped or distributed and mapped over mini slots in which the long PUCCH and the short PUSCHs overlap.

Figure 16:
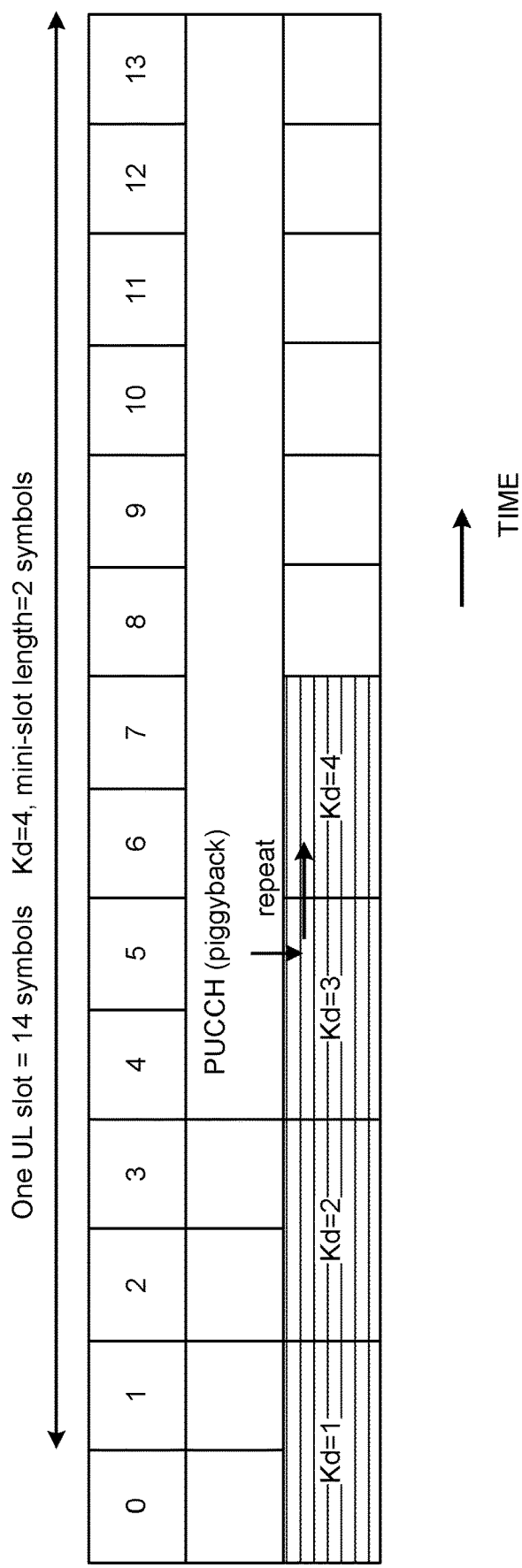
FIG. 16 is a diagram for explaining UCI on PUSCH control according to the third aspect.
Figure 17:
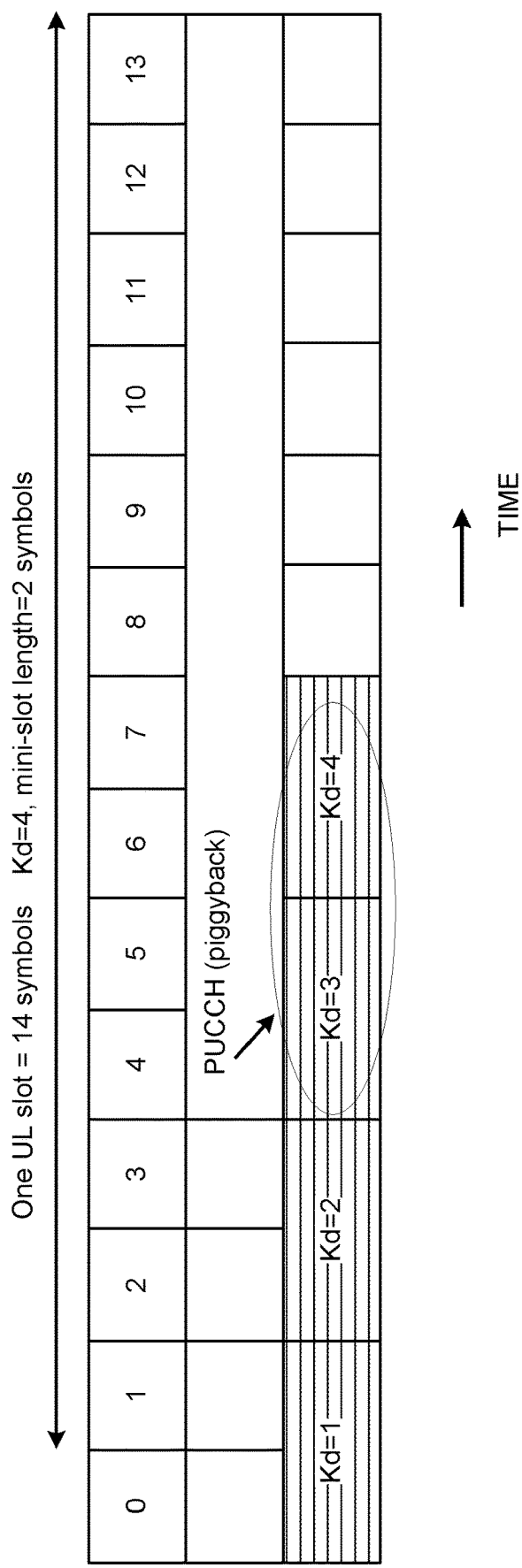
FIG. 17 is a diagram for explaining UCI on PUSCH control according to the third aspect.

A specific example where UCI on PUSCH is performed will be described with reference to FIGS. 16 and 17. FIG. 16 illustrates that a rule is determined according to kd=3, and is applied to kd=4 to perform UCI on PUSCH. FIG. 17 illustrates that UCI is collectively subjected to UCI on PUSCH. The PUSCH (kd=3 or 4) is regarded as one PUSCH to perform UCI on PUSCH.

In, for example, the case in FIG. 16, HARQ-ACK that is mapped in the first mini slot is mapped in a next slot likewise. By so doing, it is possible to integrate processing of a terminal between two mini slots, and reduce a processing burden. In the case in FIG. 17, when a resource amount for mapping the HARQ-ACK is smaller than a resource amount of the first mini slot, the HARQ-ACK is mapped only in the first mini slot. When this is not the case, the HARQ-ACK is mapped on resources of the first mini slot, and the HARQ-ACK of an insufficient resource amount is mapped in a next mini slot. By so doing, it is possible to allocate an appropriate resource amount to the HARQ-ACK.

According to the above-described third aspect, when a long PUCCH and short PUSCHs are used while Time Division Duplex (TDD) and multi-slot scheduling are applied, it is possible to appropriately perform UCI on PUSCH.

(Radio Communication System)

The configuration of the radio communication system according to the present embodiment will be described below. This radio communication system is applied the radio communication method according to each of the above aspects. In addition, the radio communication method according to each of the above aspects may be each applied alone or may be applied by combining at least two of the radio communication methods.

Figure 18:
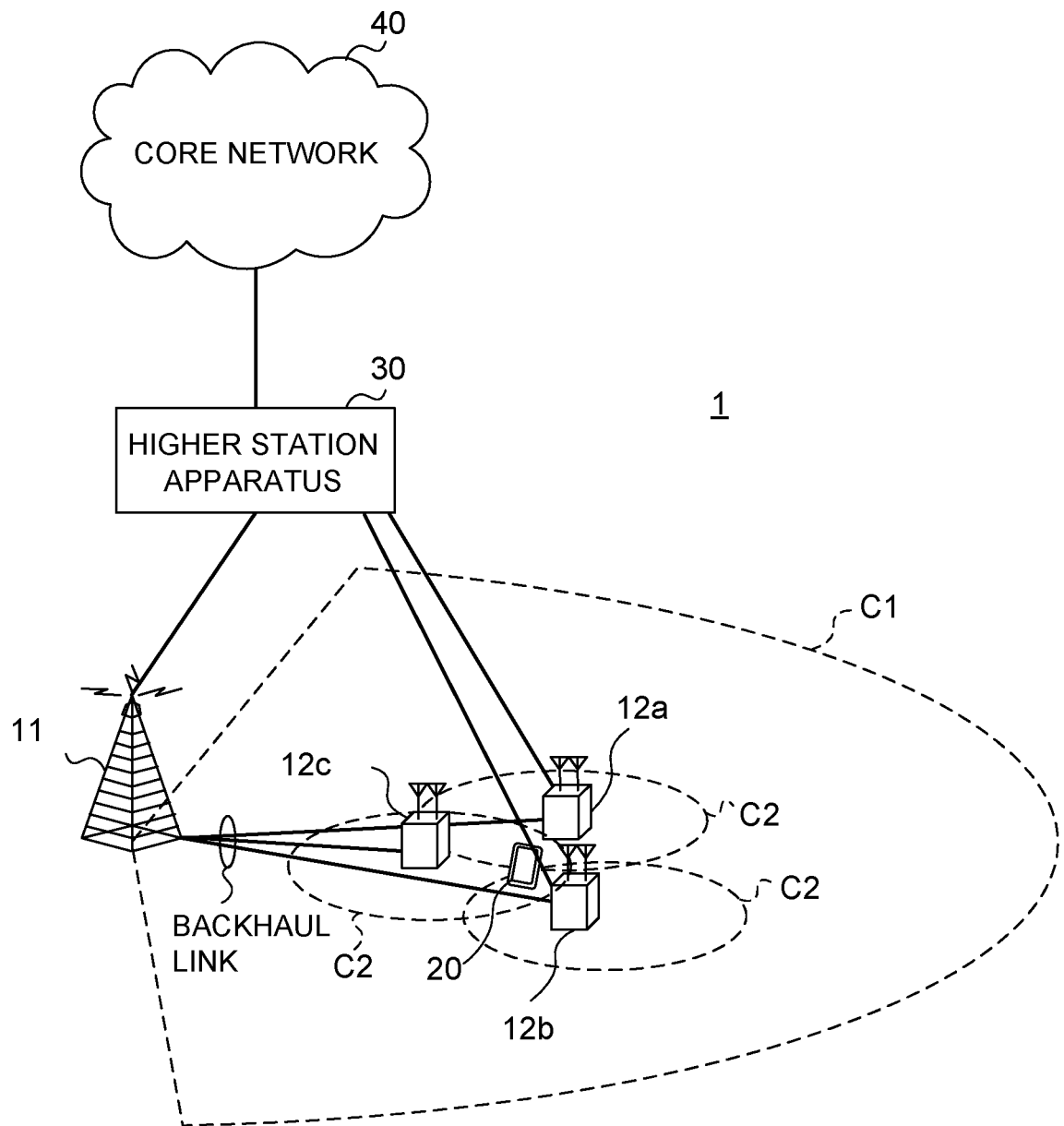
FIG. 18 is a diagram illustrating one example of a schematic configuration of a radio communication system according to the present embodiment.

FIG. 18 is a diagram illustrating one example of a schematic configuration of the radio communication system according to the present embodiment. A radio communication system 1 can apply Carrier Aggregation (CA) and/or Dual Connectivity (DC) that aggregate a plurality of base frequency blocks (component carriers) whose 1 unit is a system bandwidth (e.g., 20 MHz) of the LTE system. In this regard, the radio communication system 1 may be referred to as SUPER 3G LTE-Advanced (LTE-A), IMT-Advanced, 5G Future Radio Access (FRA) or the New Radio Access Technology (NR: New RAT).

The radio communication system 1 illustrated in FIG. 18 includes a radio base station 11 that forms a macro cell C1, and radio base stations 12a to 12c that are located in the macro cell C1 and form small cells C2 narrower than the macro cell C1. Furthermore, a user terminal 20 is located in the macro cell C1 and each small cell C2. Different numerologies may be configured to be applied between cells and/or in the cells.

In addition, the numerology is a communication parameter (e.g., at least one of a spacing of a sub-carrier (subcarrier-spacing), a bandwidth, a symbol length, a CP time duration (CP length), a subframe length, a TTI time duration (TTI length), the number of symbols per TTI, a radio frame configuration, filtering processing and windowing processing) in a frequency direction and/or a time direction. The radio communication system 1 may support subcarrier-spacings such as 15 kHz, 30 kHz, 60 kHz, 120 kHz and 240 kHz.

The user terminal 20 can connect with both of the radio base station 11 and the radio base stations 12. The user terminal 20 is assumed to concurrently use the macro cell C1 and the small cells C2 that use different frequencies by CA or DC. Furthermore, the user terminal 20 can apply CA or DC by using a plurality of cells (CCs) (e.g., two CCs or more). Furthermore, the user terminal can use licensed band CCs and unlicensed band CCs as a plurality of cells.

Furthermore, the user terminal 20 can perform communication by using Time Division Duplex (TDD) or Frequency Division Duplex (FDD) in each cell. A TDD cell and an FDD cell may be each referred to as, for example, a TDD carrier (frame configuration type 2) and an FDD carrier (frame configuration type 1).

Furthermore, each cell (carrier) may be applied a single numerology or may be applied a plurality of different numerologies.

The user terminal 20 and the radio base station 11 can communicate by using a carrier (referred to as a Legacy carrier) of a narrow bandwidth in a relatively low frequency band (e.g., 2 GHz). On the other hand, the user terminal 20 and each radio base station 12 may use a carrier of a wide bandwidth in a relatively high frequency band (e.g., 3.5 GHz, 5 GHz or 30 to 70 GHz) or may use the same carrier as that used between the user terminal 20 and the radio base station 11. In this regard, a configuration of the frequency band used by each radio base station is not limited to this.

The radio base station 11 and each radio base station 12 (or the two radio base stations 12) can be configured to be connected by way of wired connection (e.g., optical fibers compliant with a Common Public Radio Interface (CPRI) or an X2 interface) or radio connection.

The radio base station 11 and each radio base station 12 are each connected with a higher station apparatus 30 and connected with a core network 40 via the higher station apparatus 30. In this regard, the higher station apparatus 30 includes, for example, an access gateway apparatus, a Radio Network Controller (RNC) and a Mobility Management Entity (MME), yet is not limited to these. Furthermore, each radio base station 12 may be connected with the higher station apparatus 30 via the radio base station 11.

In this regard, the radio base station 11 is a radio base station that has a relatively wide coverage, and may be referred to as a macro base station, an aggregate node, an eNodeB (eNB), a gNodeB (gNB) or a transmission/reception point (TRP). Furthermore, each radio base station 12 is a radio base station that has a local coverage, and may be referred to as a small base station, a micro base station, a pico base station, a femto base station, a Home eNodeB (HeNB), a Remote Radio Head (RRH), an eNB, a gNB or a transmission/reception point. The radio base stations 11 and 12 will be collectively referred to as a radio base station 10 below when not distinguished.

Each user terminal 20 is a terminal that supports various communication schemes such as LTE, LTE-A, 5G and NR, and may include not only a mobile communication terminal but also a fixed communication terminal. Furthermore, the user terminal 20 can perform Device-to-Device communication (D2D) with the other user terminal 20.

The radio communication system 1 applies Orthogonal Frequency-Division Multiple Access (OFDMA) to Downlink (DL) and Single Carrier-Frequency Division Multiple Access (SC-FDMA) to Uplink (UL) as radio access schemes. OFDMA is a multicarrier transmission scheme that divides a frequency band into a plurality of narrow frequency bands (subcarriers) and maps data on each subcarrier to perform communication. SC-FDMA is a single carrier transmission scheme that divides a system bandwidth into a band including one or contiguous resource blocks per terminal and causes a plurality of terminals to use respectively different bands to reduce an inter-terminal interference. In this regard, uplink and downlink radio access schemes are not limited to a combination of these, and OFDMA may be used on UL.

Furthermore, the radio communication system 1 may use a multicarrier waveform (e.g., OFDM waveform), or may use a single carrier waveform (e.g., DFT-s-OFDM waveform).

The radio communication system 1 uses a DL shared channel (also referred to as, for example, a PDSCH: Physical Downlink Shared Channel or a DL data channel) shared by each user terminal 20, a broadcast channel (PBCH: Physical Broadcast Channel) and an L1/L2 control channel as DL channels. User data, higher layer control information and System Information Blocks (SIBs) are conveyed on the PDSCH. Furthermore, Master Information Blocks (MIBs) are conveyed on the PBCH.

The L1/L2 control channel includes a DL control channel (a Physical Downlink Control Channel (PDCCH) and an Enhanced Physical Downlink Control Channel (EPDCCH)), a Physical Control Format Indicator Channel (PCFICH), and a Physical Hybrid-ARQ Indicator Channel (PHICH). Downlink Control Information (DCI) including scheduling information of the PDSCH and the PUSCH is conveyed on the PDCCH. The number of OFDM symbols used for the PDCCH is conveyed on the PCFICH. The EPDCCH is subjected to frequency division multiplexing with the PDSCH and is used to convey DCI similar to the PDCCH. Retransmission control information of HARQ (ACK/NACK) for the PUSCH can be conveyed on at least one of the PHICH, the PDCCH and the EPDCCH.

The radio communication system 1 uses a UL shared channel (also referred to as, for example, a PUSCH: Physical Uplink Shared Channel or a UL shared channel) shared by each user terminal 20, an uplink control channel (PUCCH: Physical Uplink Control Channel), and a random access channel (PRACH: Physical Random Access Channel) as UL channels. User data and higher layer control information are conveyed on the PUSCH. Uplink Control Information (UCI) including at least one of retransmission control information (A/N) and Channel State Information (CSI) of the DL signal is conveyed on the PUSCH or the PUCCH. A random access preamble for establishing connection with a cell can be conveyed on the PRACH.

<Radio Base Station>

Figure 19:
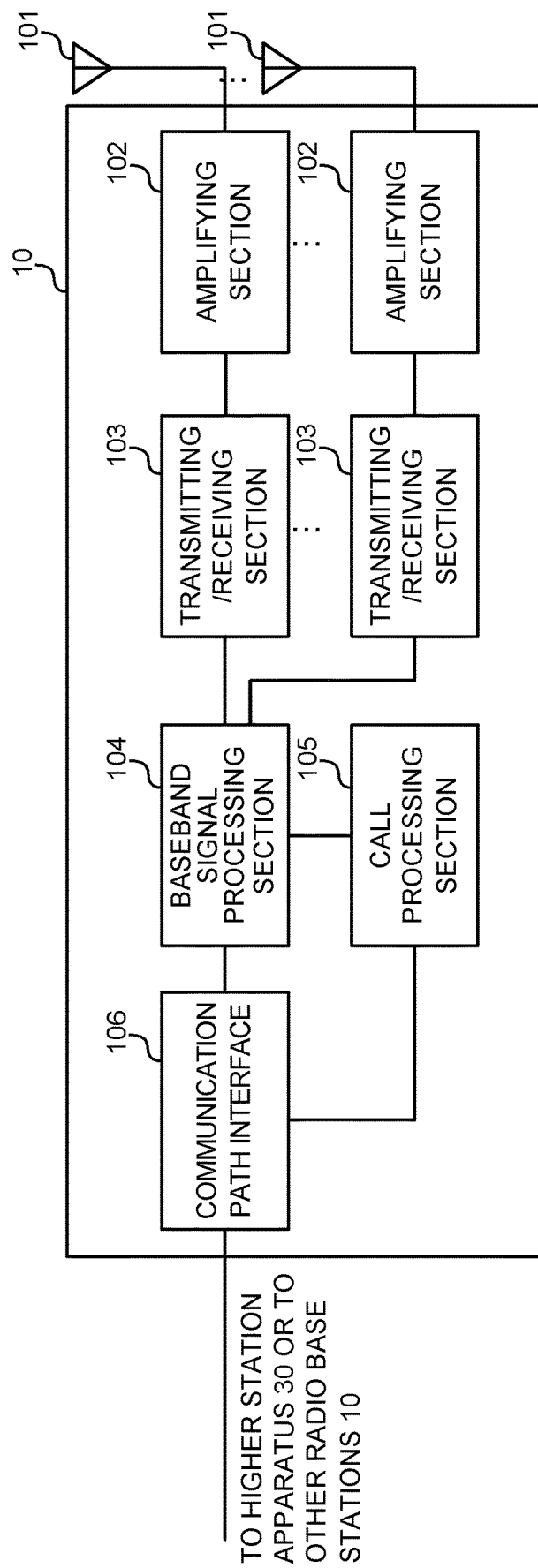
FIG. 19 is a diagram illustrating one example of an overall configuration of a radio base station according to the present embodiment.

FIG. 19 is a diagram illustrating one example of an overall configuration of the radio base station according to the present embodiment. The radio base station 10 includes pluralities of transmitting/receiving antennas 101, amplifying sections 102 and transmitting/receiving sections 103, a baseband signal processing section 104, a call processing section 105 and a communication path interface 106. In this regard, the radio base station 10 may be configured to include one or more of each of the transmitting/receiving antennas 101, the amplifying sections 102 and the transmitting/receiving sections 103.

User data transmitted from the radio base station 10 to the user terminal 20 on DL is input from the higher station apparatus 30 to the baseband signal processing section 104 via the communication path interface 106.

The baseband signal processing section 104 performs processing of a Packet Data Convergence Protocol (PDCP) layer, segmentation and concatenation of the user data, transmission processing of a Radio Link Control (RLC) layer such as RLC retransmission control, Medium Access Control (MAC) retransmission control (e.g., Hybrid Automatic Repeat reQuest (HARM) transmission processing), and transmission processing such as scheduling, transmission format selection, channel coding, Inverse Fast Fourier Transform (IFFT) processing, and precoding processing on the user data, and transfers the user data to each transmitting/receiving section 103. Furthermore, the baseband signal processing section 104 performs transmission processing such as channel coding and inverse fast Fourier transform on a downlink control signal, too, and transfers the downlink control signal to each transmitting/receiving section 103.

Each transmitting/receiving section 103 converts a baseband signal precoded and output per antenna from the baseband signal processing section 104 into a radio frequency range, and transmits a radio frequency signal. The radio frequency signal subjected to frequency conversion by each transmitting/receiving section 103 is amplified by each amplifying section 102, and is transmitted from each transmitting/receiving antenna 101.

The transmitting/receiving sections 103 can be composed of transmitters/receivers, transmitting/receiving circuits or transmitting/receiving apparatuses described based on a common knowledge in a technical field according to the present invention. In this regard, the transmitting/receiving sections 103 may be composed as an integrated transmitting/receiving section or may be composed of transmitting sections and reception sections.

Meanwhile, each amplifying section 102 amplifies a radio frequency signal received by each transmitting/receiving antenna 101 as a UL signal. Each transmitting/receiving section 103 receives the UL signal amplified by each amplifying section 102. Each transmitting/receiving section 103 performs frequency conversion on the received signal into a baseband signal, and outputs the baseband signal to the baseband signal processing section 104.

The baseband signal processing section 104 performs Fast Fourier Transform (FFT) processing, Inverse Discrete Fourier Transform (IDFT) processing, error correcting decoding, reception processing of MAC retransmission control, and reception processing of an RLC layer and a PDCP layer on UL data included in the input UL signal, and transfers the UL data to the higher station apparatus 30 via the communication path interface 106. The call processing section 105 performs call processing such as configuration and release of a communication channel, state management of the radio base station 10, and radio resource management.

The communication path interface 106 transmits and receives signals to and from the higher station apparatus 30 via a given interface. Furthermore, the communication path interface 106 may transmit and receive (backhaul signaling) signals to and from the neighboring radio base station 10 via an inter-base station interface (e.g., optical fibers compliant with the Common Public Radio Interface (CPRI) or the X2 interface).

Furthermore, each transmitting section/reception section 103 transmits a DL signal (including at least one of a DL data signal, a DL control signal and a DL reference signal) to the user terminal 20, and receives a UL signal (including at least one of a UL data signal, a UL control signal and a UL reference signal) from the user terminal 20.

Furthermore, each transmitting/receiving section 103 receives UCI from the user terminal 20 by using an uplink shared channel (e.g., PUSCH) or an uplink control channel (e.g., a short PUCCH and/or a long PUCCH). The UCI may include at least one of HARQ-ACK of a DL data channel (e.g., PDSCH), CSI, an SR, beam identification information (e.g., Beam Index (BI)) and a Buffer Status Report (BSR).

Furthermore, each transmitting/receiving section 103 may transmit control information (e.g., at least one of a format, the number of PUCCH units in a slot, a PUCCH unit size, an RS multiplexing method, an RS arrangement position, a presence/absence of the RS, an RS density, whether or more there is an SRS, and resources for the uplink control channel) related to the uplink control channel (e.g., the short PUCCH or the long PUCCH) by a physical layer signaling (L1 signaling) and/or a higher layer signaling.

When, for example, multi-slot scheduling is performed, each transmitting/receiving section 103 may transmit information for indicating the number of contiguous slots of the uplink control channel. Furthermore, each transmitting/receiving section 103 may transmit information for indicating a first slot to be allocated to transmission of the uplink control channel.

Figure 20:
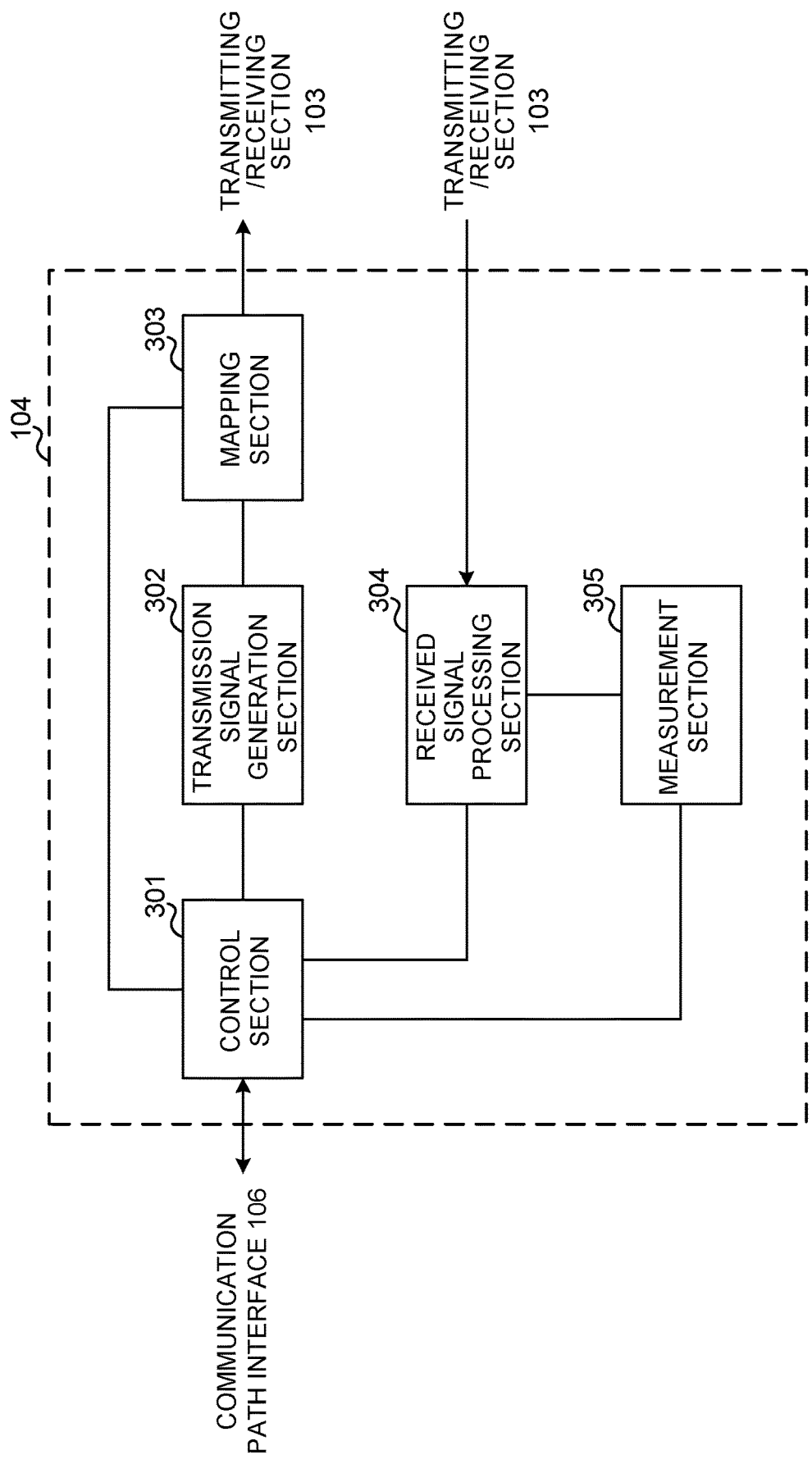
FIG. 20 is a diagram illustrating one example of a function configuration of the radio base station according to the present embodiment.

FIG. 20 is a diagram illustrating one example of a function configuration of the radio base station according to the present embodiment. In addition, FIG. 20 mainly illustrates function blocks of characteristic portions according to the present embodiment, and assumes that the radio base station 10 includes other function blocks, too, that are necessary for radio communication. As illustrated in FIG. 20, the baseband signal processing section 104 includes a control section 301, a transmission signal generation section 302, a mapping section 303, a received signal processing section 304 and a measurement section 305.

The control section 301 controls the entire radio base station 10. The control section 301 controls, for example, DL signal generation of the transmission signal generation section 302, DL signal mapping of the mapping section 303, UL signal reception processing (e.g., demodulation) of the received signal processing section 304, and measurement of the measurement section 305.

More specifically, the control section 301 schedules the user terminal 20. More specifically, the control section 301 may perform scheduling and/or retransmission control on the DL data and/or the uplink shared channel based on the UCI (e.g., the CSI and/or the BI) from the user terminal 20.

Furthermore, the control section 301 may control a configuration (format) of the uplink control channel (e.g., the long PUCCH and/or the short PUCCH), and perform control to transmit control information related to the uplink control channel.

Furthermore, the control section 301 may perform multi-slot scheduling according to the above-described first to third aspects. For example, the control section 301 may indicate the numbers of contiguous slots of the uplink control channel and/or the uplink shared channel. Furthermore, the control section 301 may indicate a first slot to be allocated to transmission of the uplink control channel and/or the uplink shared channel.

The control section 301 may control the received signal processing section 304 to perform reception processing of UCI from the user terminal 20 based on the format of the uplink control channel.

The control section 301 can be composed of a controller, a control circuit or a control apparatus described based on the common knowledge in the technical field according to the present invention.

The transmission signal generation section 302 generates a DL signal (including a DL data signal, a DL control signal or a DL reference signal) based on an instruction from the control section 301, and outputs the DL signal to the mapping section 303.

The transmission signal generation section 302 can be composed of a signal generator, a signal generating circuit or a signal generating apparatus described based on the common knowledge in the technical field according to the present invention.

The mapping section 303 maps the DL signal generated by the transmission signal generation section 302, on a given radio resource based on the instruction from the control section 301, and outputs the DL signal to each transmitting/receiving section 103. The mapping section 303 can be composed of a mapper, a mapping circuit or a mapping apparatus described based on the common knowledge in the technical field according to the present invention.

The received signal processing section 304 performs reception processing (e.g., demapping, demodulation and decoding) on a UL signal (including, for example, a UL data signal, a UL control signal and a UL reference signal) transmitted from the user terminal 20. More specifically, the received signal processing section 304 may output a received signal and a signal after the reception processing to the measurement section 305. Furthermore, the received signal processing section 304 performs UCI reception processing based on an uplink control channel configuration instructed by the control section 301.

The measurement section 305 performs measurement related to the received signal. The measurement section 305 can be composed of a measurement instrument, a measurement circuit or a measurement apparatus described based on the common knowledge in the technical field according to the present invention.

The measurement section 305 may measure UL channel quality based on, for example, received power (e.g., Reference Signal Received Power (RSRP)) and/or received quality (e.g., Reference Signal Received Quality (RSRQ)) of a UL reference signal. The measurement section 305 may output a measurement result to the control section 301.

<User Terminal>

Figure 21:
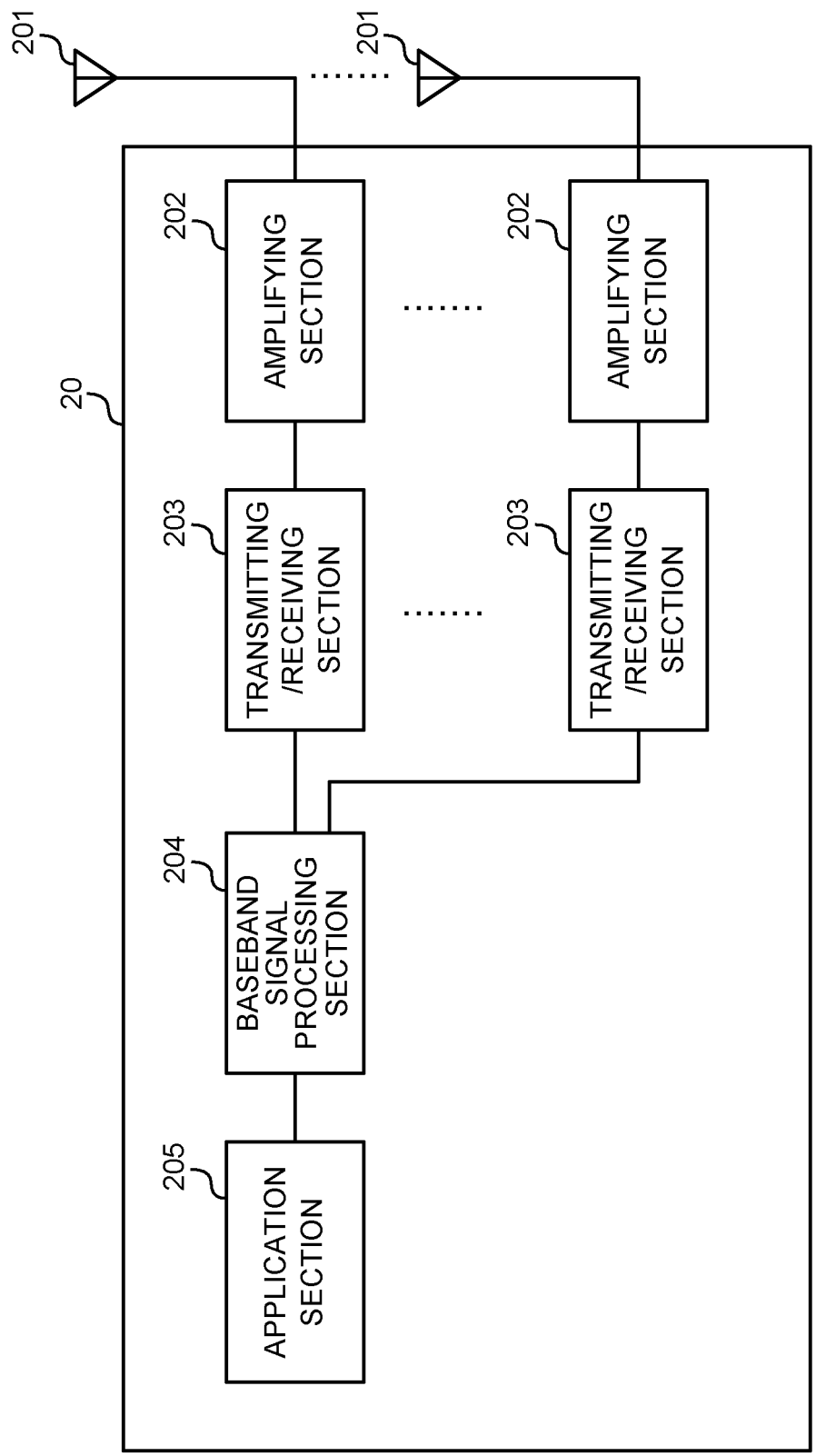
FIG. 21 is a diagram illustrating one example of an overall configuration of a user terminal according to the present embodiment.

FIG. 21 is a diagram illustrating one example of an overall configuration of the user terminal according to the present embodiment. The user terminal 20 includes pluralities of transmitting/receiving antennas 201 for MIMO transmission, amplifying sections 202 and transmitting/receiving sections 203, a baseband signal processing section 204 and an application section 205.

The respective amplifying sections 202 amplify radio frequency signals received at a plurality of transmitting/receiving antennas 201. Each transmitting/receiving section 203 receives a DL signal amplified by each amplifying section 202. Each transmitting/receiving section 203 performs frequency conversion on the received signal into a baseband signal, and outputs the baseband signal to the baseband signal processing section 204.

The baseband signal processing section 204 performs FFT processing, error correcting decoding, and reception processing of retransmission control on the input baseband signal. The baseband signal processing section 204 transfers DL data to the application section 205. The application section 205 performs processing related to layers higher than a physical layer and an MAC layer. Furthermore, the broadcast information is also transferred to the application section 205.

On the other hand, the application section 205 inputs UL data to the baseband signal processing section 204. The baseband signal processing section 204 performs retransmission control transmission processing (e.g., HARQ transmission processing), channel coding, rate matching, puncturing, Discrete Fourier Transform (DFT) processing and IFFT processing on the UL data, and transfers the UL data to each transmitting/receiving section 203. The baseband signal processing section 204 performs at least one of channel coding, rate matching, puncturing, DFT processing and IFFT processing on the UCI, too, and transfers the UCI to each transmitting/receiving section 203.

Each transmitting/receiving section 203 converts the baseband signal output from the baseband signal processing section 204 into a radio frequency range, and transmits a radio frequency signal. The radio frequency signal subjected to the frequency conversion by each transmitting/receiving section 203 is amplified by each amplifying section 202, and is transmitted from each transmitting/receiving antenna 201.

Furthermore, each transmitting/receiving section 203 receives DL signals (including a DL data signal, a DL control signal (DCI) and a DL reference signal) of numerologies configured to the user terminal 20, and transmits UL signals (including a UL data signal, a UL control signal and a UL reference signal) of the numerologies. Each transmitting/receiving section 203 may transmit the UL signals according to, for example, scheduling according to the above-described first to third aspects. Each transmitting/receiving section 203 may perform transmission in a slot or mini slot unit when transmitting the UL signals.

Furthermore, each transmitting/receiving section 203 transmits UCI to the radio base station 10 by using an uplink shared channel (e.g., PUSCH) or an uplink control channel (e.g., a short PUCCH and/or a long PUCCH).

Furthermore, each transmitting/receiving section 203 may receive information indicating K PUCCH resource sets that each include M PUCCH resources. Furthermore, each transmitting/receiving section 203 may receive higher layer control information (higher layer parameter).

The transmitting/receiving sections 203 can be composed as transmitters/receivers, transmitting/receiving circuits or transmitting/receiving apparatuses described based on the common knowledge in the technical field according to the present invention. Furthermore, the transmitting/receiving sections 203 may be composed as an integrated transmitting/receiving section or may be composed of transmitting sections and reception sections.

Figure 22:
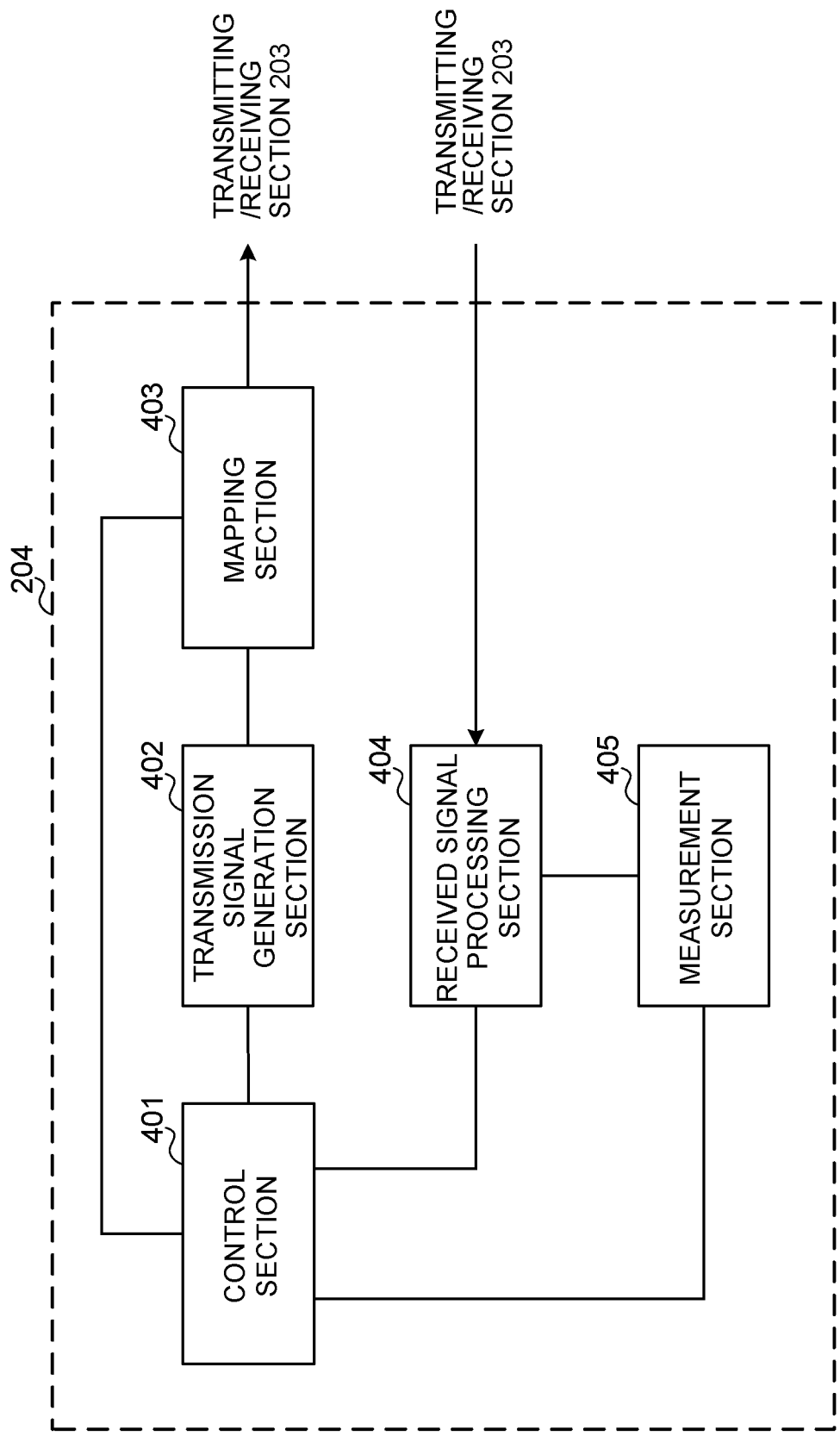
FIG. 22 is a diagram illustrating one example of a function configuration of the user terminal according to the present embodiment.

FIG. 22 is a diagram illustrating one example of a function configuration of the user terminal according to the present embodiment. In addition, FIG. 22 mainly illustrates function blocks of characteristic portions according to the present embodiment, and assumes that the user terminal 20 includes other function blocks, too, that are necessary for radio communication. As illustrated in FIG. 22, the baseband signal processing section 204 of the user terminal 20 includes a control section 401, a transmission signal generation section 402, a mapping section 403, a received signal processing section 404 and a measurement section 405.

The control section 401 controls the entire user terminal 20. The control section 401 controls, for example, UL signal generation of the transmission signal generation section 402, UL signal mapping of the mapping section 403, DL signal reception processing of the received signal processing section 404 and measurement of the measurement section 405.

Furthermore, the control section 401 controls an uplink control channel used for transmission of UCI from the user terminal 20 based on an explicit instruction from the radio base station 10 or implicit determination in the user terminal 20. Furthermore, the control section 401 controls transmission of the UCI.

Furthermore, the control section 401 may control a configuration (format) of the uplink control channel (e.g., a long PUCCH and/or a short PUCCH). The control section 401 may control the format of the uplink control channel based on control information from the radio base station 10. Furthermore, the control section 401 may control the PUCCH format (the uplink control channel format) used for transmission of the UCI based on information related to fallback.

Furthermore, the control section 401 may control UCI on PUSCH according to the above-described first to third aspects. Based on, for example, a Downlink (DL)/Uplink (UL) allocation configuration of Time Division Duplex (TDD), and a relationship (indicated by multi-slot scheduling) between a plurality of slots indicated to transmission of the uplink data and a plurality of slots indicated to transmission of the uplink control information, the control section 401 may control transmission of the uplink control information via an uplink data channel.

When a matching slot between a plurality of slots indicated to the transmission of the uplink data and a plurality of slots indicated to the transmission of the uplink control information supports UL of the DL/UL allocation configuration, the control section 401 may transmit the uplink control information in the matching slot via the uplink data channel.

When the matching slot does not support UL of the DL/UL allocation configuration, the control section 401 may transmit the uplink control information of the matching slot in a slot that is a slot subsequent to the matching slot and supports UL of the DL/UL allocation configuration.

When the matching slot does not support UL of the DL/UL allocation configuration, the control section 401 may not transmit the uplink control information in the slot subsequent to the matching slot.

When a start slot of a plurality of slots indicated to the transmission of the uplink data and a start slot of a plurality of slots indicated to the transmission of the uplink control information do not match, the control section 401 may perform only transmission of at least one of the uplink data and the uplink control information.

The control section 401 can be composed of a controller, a control circuit or a control apparatus described based on the common knowledge in the technical field according to the present invention.

The transmission signal generation section 402 generates (e.g., encodes, rate-matches, punctures and modulates) UL signals (including a UL data signal, a UL control signal, a UL reference signal and UCI) based on an instruction from the control section 401, and outputs the UL signal to the mapping section 403. The transmission signal generation section 402 can be composed of a signal generator, a signal generating circuit or a signal generating apparatus described based on the common knowledge in the technical field according to the present invention.

The mapping section 403 maps the UL signal generated by the transmission signal generation section 402, on a radio resource based on the instruction from the control section 401, and outputs the UL signal to each transmitting/receiving section 203. The mapping section 403 can be composed of a mapper, a mapping circuit or a mapping apparatus described based on the common knowledge in the technical field according to the present invention.

The received signal processing section 404 performs reception processing (e.g., demapping, demodulation and decoding) on the DL signal (a DL data signal, scheduling information, a DL control signal or a DL reference signal).

The received signal processing section 404 outputs information received from the radio base station 10 to the control section 401. The received signal processing section 404 outputs, for example, broadcast information, system information, higher layer control information of a higher layer signaling such as an RRC signaling and physical layer control information (L1/L2 control information) to the control section 401.

The received signal processing section 404 can be composed of a signal processor, a signal processing circuit or a signal processing apparatus described based on the common knowledge in the technical field according to the present invention. Furthermore, the received signal processing section 404 can compose the reception section according to the present invention.

The measurement section 405 measures a channel state based on a reference signal (e.g., CSI-RS) from the radio base station 10, and outputs a measurement result to the control section 401. In addition, the measurement section 405 may measure the channel state per CC.

The measurement section 405 can be composed of a signal processor, a signal processing circuit or a signal processing apparatus, and a measurement instrument, a measurement circuit or a measurement apparatus described based on the common knowledge in the technical field according to the present invention.

<Hardware Configuration>

In addition, the block diagrams used to describe the above embodiment illustrate blocks in function units. These function blocks (components) are realized by an optional combination of hardware and/or software. Furthermore, a method for realizing each function block is not limited in particular. That is, each function block may be realized by using one physically and/or logically coupled apparatus or may be realized by using a plurality of these apparatuses formed by connecting two or more physically and/or logically separate apparatuses directly and/or indirectly (by using, for example, wired connection and/or radio connection).

Figure 23:
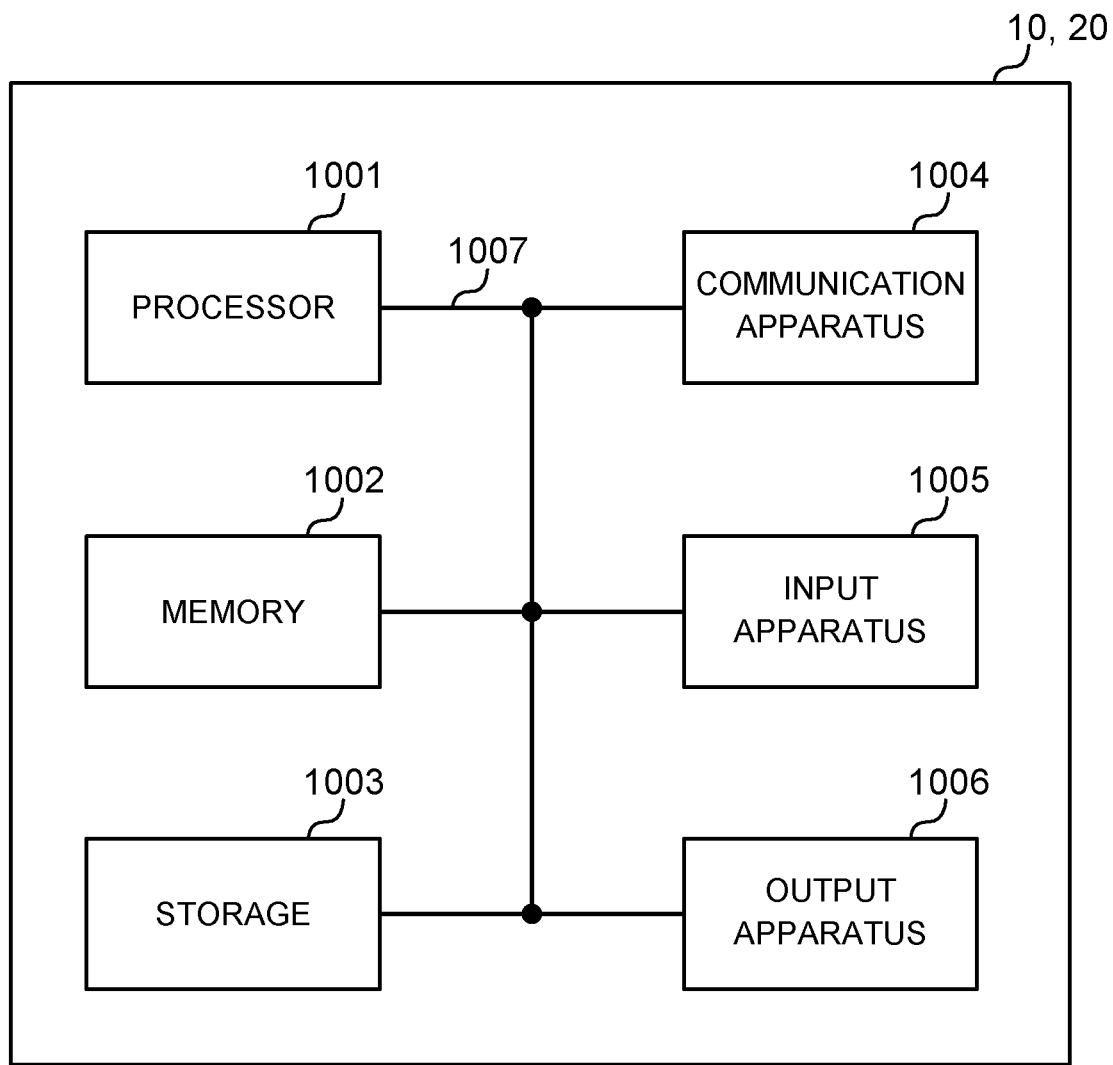
FIG. 23 is a diagram illustrating one example of hardware configurations of the radio base station and the user terminal according to the present embodiment.

For example, the radio base station and the user terminal according to the one embodiment of the present invention may function as computers that perform processing of the radio communication method according to the present invention. FIG. 23 is a diagram illustrating one example of the hardware configurations of the radio base station and the user terminal according to the one embodiment of the present invention. The above radio base station 10 and user terminal 20 may be each physically configured as a computer apparatus that includes a processor 1001, a memory 1002, a storage 1003, a communication apparatus 1004, an input apparatus 1005, an output apparatus 1006 and a bus 1007.

In this regard, a word "apparatus" in the following description can be read as a circuit, a device or a unit. The hardware configurations of the radio base station 10 and the user terminal 20 may be configured to include one or a plurality of apparatuses illustrated in FIG. 23 or may be configured without including part of the apparatuses.

For example, FIG. 23 illustrates the only one processor 1001. However, there may be a plurality of processors. Furthermore, processing may be executed by 1 processor or processing may be executed by 1 or more processors concurrently, successively or by using another method. In addition, the processor 1001 may be implemented by 1 or more chips.

Each function of the radio base station 10 and the user terminal 20 is realized by, for example, causing hardware such as the processor 1001 and the memory 1002 to read given software (program), and thereby causing the processor 1001 to perform an operation, and control communication via the communication apparatus 1004 and control reading and/or writing of data in the memory 1002 and the storage 1003.

The processor 1001 causes, for example, an operating system to operate to control the entire computer. The processor 1001 may be composed of a Central Processing Unit (CPU) including an interface for a peripheral apparatus, a control apparatus, an operation apparatus and a register. For example, the above baseband signal processing section 104 (204) and call processing section 105 may be realized by the processor 1001.

Furthermore, the processor 1001 reads programs (program codes), a software module or data from the storage 1003 and/or the communication apparatus 1004 out to the memory 1002, and executes various types of processing according to these programs, software module or data. As the programs, programs that cause the computer to execute at least part of the operations described in the above embodiment are used. For example, the control section 401 of the user terminal 20 may be realized by a control program that is stored in the memory 1002 and operates on the processor 1001, and other function blocks may be also realized likewise.

The memory 1002 is a computer-readable recording medium, and may be composed of at least one of, for example, a Read Only Memory (ROM), an Erasable Programmable ROM (EPROM), an Electrically EPROM (EEPROM), a Random Access Memory (RAM) and other appropriate storage media. The memory 1002 may be referred to as a register, a cache or a main memory (main storage apparatus). The memory 1002 can store programs (program codes) and a software module that can be executed to perform the radio communication method according to the one embodiment of the present invention.

The storage 1003 is a computer-readable recording medium, and may be composed of at least one of, for example, a flexible disk, a floppy (registered trademark) disk, a magnetooptical disk (e.g., a compact disk (Compact Disc ROM (CD-ROM)), a digital versatile disk and a Blu-ray (registered trademark) disk), a removable disk, a hard disk drive, a smart card, a flash memory device (e.g., a card, a stick or a key drive), a magnetic stripe, a database, a server and other appropriate storage media. The storage 1003 may be referred to as an auxiliary storage apparatus.

The communication apparatus 1004 is hardware (transmitting/receiving device) that performs communication between computers via wired and/or radio networks, and will be also referred to as, for example, a network device, a network controller, a network card and a communication module. The communication apparatus 1004 may be configured to include a high frequency switch, a duplexer, a filter and a frequency synthesizer to realize, for example, Frequency Division Duplex (FDD) and/or Time Division Duplex (TDD). For example, the above transmitting/receiving antennas 101 (201), amplifying sections 102 (202), transmitting/receiving sections 103 (203) and communication path interface 106 may be realized by the communication apparatus 1004.

The input apparatus 1005 is an input device (e.g., a keyboard, a mouse, a microphone, a switch, a button or a sensor) that accepts an input from an outside. The output apparatus 1006 is an output device (e.g., a display, a speaker or a Light Emitting Diode (LED) lamp) that sends an output to the outside. In addition, the input apparatus 1005 and the output apparatus 1006 may be an integrated component (e.g., touch panel).

Furthermore, each apparatus such as the processor 1001 or the memory 1002 is connected by the bus 1007 that communicates information. The bus 1007 may be composed by using a single bus or may be composed by using a bus that differs per apparatus.

Furthermore, the radio base station 10 and the user terminal 20 may be configured to include hardware such as a microprocessor, a Digital Signal Processor (DSP), an Application Specific Integrated Circuit (ASIC), a Programmable Logic Device (PLD) and a Field Programmable Gate Array (FPGA). The hardware may be used to realize part or all of each function block. For example, the processor 1001 may be implemented by using at least one of these types of hardware.

Modified Example

In addition, each term that has been described in this description and/or each term that is necessary to understand this description may be replaced with terms having identical or similar meanings. For example, a channel and/or a symbol may be signals (signalings). Furthermore, a signal may be a message. A reference signal can be also abbreviated as an RS (Reference Signal), or may be also referred to as a pilot or a pilot signal depending on standards to be applied. Furthermore, a Component Carrier (CC) may be referred to as a cell, a frequency carrier and a carrier frequency.

Furthermore, a radio frame may include one or a plurality of durations (frames) in a time-domain. Each of one or a plurality of durations (frames) that composes a radio frame may be referred to as a subframe. Furthermore, the subframe may include one or a plurality of slots in the time-domain. The subframe may be a fixed time duration (e.g., 1 ms) that does not depend on the numerologies.

Furthermore, the slot may include one or a plurality of symbols (Orthogonal Frequency Division Multiplexing (OFDM) symbols or Single Carrier-Frequency Division Multiple Access (SC-FDMA) symbols) in the time-domain. Furthermore, the slot may be a time unit based on the numerologies. Furthermore, the slot may include a plurality of mini slots. Each mini slot may include one or a plurality of symbols in the time-domain. Furthermore, the mini slot may be referred to as a sub slot.

The radio frame, the subframe, the slot, the mini slot and the symbol each indicate a time unit for conveying signals. The other corresponding names may be used for the radio frame, the subframe, the slot, the mini slot and the symbol. For example, 1 subframe may be referred to as a Transmission Time Interval (TTI), a plurality of contiguous subframes may be referred to as TTIs, or 1 slot or 1 mini slot may be referred to as a TTI. That is, the subframe and/or the TTI may be a subframe (1 ms) according to legacy LTE, may be a duration (e.g., 1 to 13 symbols) shorter than 1 ms or may be a duration longer than 1 ms. In addition, a unit that indicates the TTI may be referred to as a slot or a mini slot instead of a subframe.

In this regard, the TTI refers to, for example, a minimum time unit of scheduling for radio communication. For example, in the LTE system, the radio base station performs scheduling for allocating radio resources (a frequency bandwidth or transmission power that can be used by each user terminal) in TTI units to each user terminal. In this regard, a definition of the TTI is not limited to this.

The TTI may be a transmission time unit of a channel-coded data packet (transport block), code block and/or codeword, or may be a processing unit of scheduling or link adaptation. In addition, when the TTI is given, a time period (e.g., the number of symbols) in which a transport block, a code block and/or a codeword are actually mapped may be shorter than the TTI.

In addition, when 1 slot or 1 mini slot is referred to as a TTI, 1 or more TTIs (i.e., 1 or more slots or 1 or more mini slots) may be a minimum time unit of scheduling. Furthermore, the number of slots (the number of mini slots) that compose a minimum time unit of the scheduling may be controlled.

The TTI having the time duration of 1 ms may be referred to as a general TTI (TTIs according to LTE Rel. 8 to 12), a normal TTI, a long TTI, a general subframe, a normal subframe or a long subframe. A TTI shorter than the general TTI may be referred to as a reduced TTI, a short TTI, a partial or fractional TTI, a reduced subframe, a short subframe, a mini slot or a subslot.

In addition, the long TTI (e.g., the general TTI or the subframe) may be read as a TTI having a time duration exceeding 1 ms, and the short TTI (e.g., the reduced TTI) may be read as a TTI having a TTI length less than the TTI length of the long TTI and equal to or more than 1 ms.

Resource Blocks (RBs) are resource allocation units of the time-domain and the frequency-domain, and may include one or a plurality of contiguous subcarriers in the frequency-domain. Furthermore, the RB may include one or a plurality of symbols in the time-domain or may have the length of 1 slot, 1 mini slot, 1 subframe or 1 TTI. 1 TTI or 1 subframe may each include one or a plurality of resource blocks. In this regard, one or a plurality of RBs may be referred to as a Physical Resource Block (PRB: Physical RB), a Sub-Carrier Group (SCG), a Resource Element Group (REG), a PRB pair or an RB pair.

Furthermore, the resource block may include one or a plurality of Resource Elements (REs). For example, 1 RE may be a radio resource domain of 1 subcarrier and 1 symbol.

In this regard, structures of the above radio frame, subframe, slot, mini slot and symbol are only exemplary structures. For example, configurations such as the number of subframes included in a radio frame, the number of slots per subframe or radio frame, the number of mini slots included in a slot, the numbers of symbols and RBs included in a slot or a mini slot, the number of subcarriers included in an RB, the number of symbols in a TTI, a symbol length and a Cyclic Prefix (CP) length can be variously changed.

Furthermore, the information and parameters described in this description may be expressed by using absolute values, may be expressed by using relative values with respect to given values or may be expressed by using other corresponding information. For example, a radio resource may be instructed by a given index.

Names used for parameters in this description are in no respect restrictive names. For example, various channels (the Physical Uplink Control Channel (PUCCH) and the Physical Downlink Control Channel (PDCCH)) and information elements can be identified based on various suitable names. Therefore, various names assigned to these various channels and information elements are in no respect restrictive names.

The information and the signals described in this description may be expressed by using one of various different techniques. For example, the data, the instructions, the commands, the information, the signals, the bits, the symbols and the chips mentioned in the above entire description may be expressed as voltages, currents, electromagnetic waves, magnetic fields or magnetic particles, optical fields or photons, or optional combinations of these.

Furthermore, the information and the signals can be output from a higher layer to a lower layer and/or from the lower layer to the higher layer. The information and the signals may be input and output via a plurality of network nodes.

The input and output information and signals may be stored in a specific location (e.g., memory) or may be managed by using a management table. The information and signals to be input and output can be overwritten, updated or additionally written. The output information and signals may be deleted. The input information and signals may be transmitted to other apparatuses.

Notification of information is not limited to the aspect/embodiment described in this description and may be performed by using other methods. For example, the information may be notified by a physical layer signaling (e.g., Downlink Control Information (DCI) and Uplink Control Information (UCI)), a higher layer signaling (e.g., a Radio Resource Control (RRC) signaling, broadcast information (Master Information Blocks (MIBs) and System Information Blocks (SIGs)), and a Medium Access Control (MAC) signaling), other signals or combinations of these.

In addition, the physical layer signaling may be referred to as Layer 1/Layer 2 (L1/L2) control information (L1/L2 control signal) or L1 control information (L1 control signal). Furthermore, the RRC signaling may be referred to as an RRC message, and may be, for example, an RRCConnectionSetup message or an RRCConnectionReconfiguration message. Furthermore, the MAC signaling may be notified by using, for example, an MAC Control Element (MAC CE).

Furthermore, notification of given information (e.g., notification of "being X") is not limited to explicit notification, and may be performed implicitly (by, for example, not notifying this given information or by notifying another information). Decision may be made based on a value (0 or 1) expressed as 1 bit, may be made based on a boolean expressed as true or false or may be made by comparing numerical values (by, for example, making comparison with a given value).

Irrespectively of whether software is referred to as software, firmware, middleware, a microcode or a hardware description language or as other names, the software should be widely interpreted to mean a command, a command set, a code, a code segment, a program code, a program, a subprogram, a software module, an application, a software application, a software package, a routine, a subroutine, an object, an executable file, an execution thread, a procedure or a function.

Furthermore, software, commands and information may be transmitted and received via transmission media. When, for example, the software is transmitted from websites, servers or other remote sources by using wired techniques (e.g., coaxial cables, optical fiber cables, twisted pairs and Digital Subscriber Lines (DSLs)) and/or radio techniques (e.g., infrared rays and microwaves), these wired techniques and/or radio technique are included in a definition of the transmission media.

The terms "system" and "network" used in this description can be compatibly used.

In this description, the terms "Base Station (BS)", "radio base station", "eNB", "gNB", "cell", "sector", "cell group", "carrier" and "component carrier" can be compatibly used.

The base station will be also referred to as a term such as a fixed station, a NodeB, an eNodeB (eNB), an access point, a transmission point, a reception point, a transmission/reception point, a femtocell or a small cell in some cases.

The base station can accommodate one or a plurality of (e.g., three) cells (also referred to as sectors). When the base station accommodates a plurality of cells, an entire coverage area of the base station can be partitioned into a plurality of smaller areas. Each smaller area can also provide communication service via a base station subsystem (e.g., indoor small base station (RRH: Remote Radio Head)). The term "cell" or "sector" indicates part or the entirety of the coverage area of the base station and/or the base station subsystem that provide communication service in this coverage.

In this description, the terms "Mobile Station (MS)", "user terminal", "User Equipment (UE)" and "terminal" can be compatibly used.

The mobile station will be also referred to by a person skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or some other appropriate terms in some cases.

The base station and/or the mobile station may be referred to as a transmission apparatus or a reception apparatus.

Furthermore, the radio base station in this description may be read as the user terminal. For example, each aspect/embodiment of the present invention may be applied to a configuration where communication between the radio base station and the user terminal is replaced with communication between a plurality of user terminals (D2D: Device-to-Device). In this case, the user terminal 20 may be configured to include the functions of the above radio base station 10. Furthermore, words such as "uplink" and "downlink" may be read as a "side". For example, the uplink channel may be read as a side channel.

Similarly, the user terminal in this description may be read as the radio base station. In this case, the radio base station 10 may be configured to include the functions of the above user terminal 20.

In this description, operations performed by the base station are performed by an upper node of this base station depending on cases. Obviously, in a network including one or a plurality of network nodes including the base stations, various operations performed to communicate with a terminal can be performed by base stations, one or more network nodes (that are supposed to be, for example, Mobility Management Entities (MMEs) or Serving-Gateways (S-GWs) yet are not limited to these) other than the base stations or a combination of these.

Each aspect/embodiment described in this description may be used alone, may be used in combination or may be switched and used when carried out. Furthermore, orders of the processing procedures, the sequences and the flowchart according to each aspect/embodiment described in this description may be rearranged unless contradictions arise. For example, the method described in this description presents various step elements in an exemplary order and is not limited to the presented specific order.

Each aspect/embodiment described in this description may be applied to Long Term Evolution (LTE), LTE-Advanced (LTE-A), LTE-Beyond (LTE-B), SUPER 3G IMT-Advanced, the 4th generation mobile communication system (4G), the 5th generation mobile communication system (5G), Future Radio Access (FRA), the New Radio Access Technology (New-RAT), New Radio (NR), New radio access (NX), Future generation radio access (FX), Global System for Mobile communications (GSM) (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other appropriate radio communication methods and/or next-generation systems that are expanded based on these systems.

The phrase "based on" used in this description does not mean "based only on" unless specified otherwise. In other words, the phrase "based on" means both of "based only on" and "based at least on".

Every reference to elements that use names such as "first" and "second" used in this description does not generally limit the quantity or the order of these elements. These names can be used in this description as a convenient method for distinguishing between two or more elements. Hence, the reference to the first and second elements does not mean that only two elements can be employed or the first element should precede the second element in some way.

The term "deciding (determining)" used in this description includes diverse operations in some cases. For example, "deciding (determining)" may be regarded to "decide (determine)" calculating, computing, processing, deriving, investigating, looking up (e.g., looking up in a table, a database or another data structure) and ascertaining. Furthermore, "deciding (determining)" may be regarded to "decide (determine)" receiving (e.g., receiving information), transmitting (e.g., transmitting information), input, output and accessing (e.g., accessing data in a memory). Furthermore, "deciding (determining)" may be regarded to "decide (determine)" resolving, selecting, choosing, establishing and comparing. That is, "deciding (determining)" may be regarded to "decide (determine)" some operation.

The words "connected" and "coupled" used in this description or every modification of these words can mean every direct or indirect connection or coupling between 2 or more elements, and can include that 1 or more intermediate elements exist between the two elements "connected" or "coupled" with each other. The elements may be coupled or connected physically, logically or by a combination of the physical and logical connections. For example, "connection" may be read as "access".

It can be understood that, when connected in this description, the two elements are "connected" or "coupled" with each other by using one or more electric wires, cables and/or printed electrical connection, and by using electromagnetic energy having wavelengths in radio frequency domains, microwave domains and/or (both of visible and invisible) light domains in some non-restrictive and non-comprehensive examples.

A sentence that "A and B are different" in this description may mean that "A and B are different from each other". Words such as "separate" and "coupled" may be also interpreted in a similar manner.

When the words "including" and "comprising" and modifications of these words are used in this description or the claims, these words intend to be comprehensive similar to the word "having". Furthermore, the word "or" used in this description or the claims intends not to be an XOR.

The present invention has been described in detail above. However, it is obvious for a person skilled in the art that the present invention is not limited to the embodiment described in this description. The present invention can be carried out as modified and changed aspects without departing from the gist and the scope of the present invention defined based on the recitation of the claims. Accordingly, the disclosure of this description is intended for exemplary explanation, and does not bring any restrictive meaning to the present invention.

The invention claimed is:

1. A terminal comprising:
a receiver that receives a first information regarding a first number of slots for use in transmission of an uplink control channel, and a second information regarding a second number of slots, to which a same value as the first number of slots can be configured, for use in transmission of an uplink shared channel; and
a processor that controls so as not to perform the transmission of the uplink shared channel in at least one slot in which overlapping occurs, when both the first number of slots for use in transmission of the uplink control channel and the second number of slots for use in transmission of the uplink shared channel are two or more, and if the transmission of the uplink shared channel and the transmission of the uplink control channel overlap in the at least one slot,
wherein the first number of slots for use in transmission of the uplink control channel and the second number of slots for use in transmission of the uplink shared channel are separately configured by higher layer signaling,
wherein the processor controls to transmit the uplink shared channel in a plurality of consecutive slots for transmitting the uplink shared channel configured based on information regarding a slot configuration that indicates whether a slot out of the plurality of consecutive slots is a slot in which downlink transmission can be performed or a slot in which uplink transmission can be performed, when all slots included in the plurality of consecutive slots are slots in which uplink transmission can be performed and determines the first number of slots for use in the transmission of the uplink control channel based on the information regarding the slot configuration,
wherein a same start symbol and a same number of symbols are used in each slot of the consecutive slots, and
wherein the information regarding the slot configuration is configured by cell-specific higher layer signaling.

2. A radio communication method comprising:
receiving a first information regarding a first number of slots for use in transmission of an uplink control channel, and a second information regarding a second number of slots, to which a same value as the first number of slots can be configured, for use in transmission of an uplink shared channel;
controlling so as not to perform the transmission of the uplink shared channel in at least one slot in which overlapping occurs, when both the first number of slots for use in transmission of the uplink control channel and the second number of slots for use in transmission of the uplink shared channel are two or more, and if the transmission of the uplink shared channel and the transmission of the uplink control channel overlap in the at least one slot;
controlling to transmit the uplink shared channel in a plurality of consecutive slots for transmitting the uplink shared channel configured based on information regarding a slot configuration that indicates whether a slot out of the plurality of consecutive slots is a slot in which downlink transmission can be performed or a slot in which uplink transmission can be performed, when all slots included in the plurality of consecutive slots are slots in which uplink transmission can be performed; and
determining the first number of slots for use in the transmission of the uplink control channel based on the information regarding the slot configuration,
wherein the first number of slots for use in transmission of the uplink control channel and the second number of slots for use in transmission of the uplink shared channel are separately configured by higher layer signaling,
wherein a same start symbol and a same number of symbols are used in each slot of the consecutive slots, and
wherein the information regarding the slot configuration is configured by cell-specific higher layer signaling.

3. A base station comprising:
a transmitter that transmits a first information regarding a first number of slots for use in transmission of an uplink control channel by a terminal, and a second information regarding a second number of slots, to which a same value as the first number of slots can be configured, for use in transmission of an uplink shared channel by the terminal; and
a processor that determines that the uplink shared channel is not transmitted in at least one slot in which overlapping occurs, when both the first number of slots for use in transmission of the uplink control channel and the second number of slots for use in transmission of the uplink shared channel are two or more, and if the transmission of the uplink shared channel and the transmission of the uplink control channel overlap in the at least one slot,
wherein the first number of slots for use in transmission of the uplink control channel and the second number of slots for use in transmission of the uplink shared channel are separately configured by higher layer signaling,
wherein the transmitter notifies that all slots included in a plurality of consecutive slots are slots, in which uplink transmission can be performed, for transmitting the uplink shared channel by transmitting information regarding a slot configuration that indicates whether a slot out of the plurality of consecutive slots is a slot in which downlink transmission can be performed or a slot in which uplink transmission can be performed,
wherein the first number of slots for use in the transmission of the uplink control channel is determined based on the information regarding the slot configuration,
wherein a same start symbol and a same number of symbols are used in each slot of the consecutive slots, and
wherein the information regarding the slot configuration is configured by cell-specific higher layer signaling.

4. A system comprising a terminal and a base station, wherein:
the terminal comprises:
a receiver that receives a first information regarding a first number of slots for use in transmission of an uplink control channel, and a second information regarding a second number of slots, to which a same value as the first number of slots can be configured, for use in transmission of an uplink shared channel; and a processor that controls so as not to perform the transmission of the uplink shared channel in at least one slot in which overlapping occurs, when both the first number of slots for use in transmission of the uplink control channel and the second number of slots for use in transmission of the uplink shared channel are two or more, and if the transmission of the uplink shared channel and the transmission of the uplink control channel overlap in the at least one slot, wherein the processor controls to transmit the uplink shared channel in a plurality of consecutive slots for transmitting the uplink shared channel configured based on information regarding a slot configuration that indicates whether a slot out of the plurality of consecutive slots is a slot in which downlink transmission can be performed or a slot in which uplink transmission can be performed, when all slots included in the plurality of consecutive slots are slots in which uplink transmission can be performed and determines the first number of slots for use in the transmission of the uplink control channel based on the information regarding the slot configuration, and wherein a same start symbol and a same number of symbols are used in each slot of the consecutive slots, and the base station comprises:
  a transmitter that transmits the first information and the second information, and wherein the first number of slots for use in transmission of the uplink control channel and the second number of slots for use in transmission of the uplink shared channel are separately configured by higher layer signaling, and wherein the information regarding the slot configuration is configured by cell-specific higher layer signaling.

* * * * *